US010749939B2

(12) United States Patent
Moon et al.

(10) Patent No.: US 10,749,939 B2
(45) Date of Patent: *Aug. 18, 2020

(54) APPLICATION MONITORING FOR CLOUD-BASED ARCHITECTURES

(71) Applicant: BMC Software, Inc., Houston, TX (US)

(72) Inventors: Cliff Moon, San Mateo, CA (US); Benjamin Black, Seattle, WA (US)

(73) Assignee: BMC Software, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/205,764

(22) Filed: Nov. 30, 2018

(65) Prior Publication Data
US 2019/0098076 A1 Mar. 28, 2019

Related U.S. Application Data

(63) Continuation of application No. 15/809,380, filed on Nov. 10, 2017, now Pat. No. 10,171,565, which is a
(Continued)

(51) Int. Cl.
H04L 29/08 (2006.01)
G06F 11/34 (2006.01)
H04L 12/26 (2006.01)
G06F 11/30 (2006.01)

(52) U.S. Cl.
CPC ............ H04L 67/10 (2013.01); G06F 11/302 (2013.01); G06F 11/3006 (2013.01);
(Continued)

(58) Field of Classification Search
CPC ..................................................... H04L 43/08
See application file for complete search history.

(56) References Cited

U.S. PATENT DOCUMENTS

2011/0022812 A1 1/2011 Van Der Linden et al.
2011/0231862 A1 9/2011 Walsh
(Continued)

OTHER PUBLICATIONS

Alcock, et al., "Passive Detection of TCP Congestion Events." Telecommunications (ICT), 2011 18th International Conference on. IEEE, 2011 (6 pages).
(Continued)

Primary Examiner — Adnan M Mirza
(74) Attorney, Agent, or Firm — Brake Hughes Bellermann LLP

(57) ABSTRACT

An example system may include one or more collectors and an analyzer. The one or more collectors receive a plurality of data streams that include operational data for a plurality of application nodes. The plurality of data streams are captured and provided by a plurality of meters deployed on at least one cloud computing platform to respectively meter the plurality of application nodes. The analyzer processes the plurality of data streams to generate real-time performance data for a first application of a plurality of applications and generates, based on the real-time performance data for the application instances, statistics for data flows between components of the first application. The analyzer generates comparative statistics on the performance of the first application relative to the performance of the plurality of applications hosted, and reallocated, based on the comparative statistics, resources for the performance of the first application.

20 Claims, 19 Drawing Sheets

Related U.S. Application Data continuation of application No. 13/900,441, filed on May 22, 2013, now Pat. No. 9,819,729.

(60) Provisional application No. 61/806,863, filed on Mar. 30, 2013, provisional application No. 61/745,406, filed on Dec. 21, 2012.

(52) U.S. Cl.
CPC .......... *G06F 11/34* (2013.01); *G06F 11/3409* (2013.01); *H04L 43/08* (2013.01); *H04L 67/125* (2013.01); *G06F 11/3428* (2013.01); *G06F 2201/805* (2013.01); *G06F 2201/81* (2013.01); *G06F 2201/86* (2013.01); *G06F 2201/865* (2013.01); *G06F 2201/875* (2013.01)

(56) References Cited

U.S. PATENT DOCUMENTS

| | | |
|---|---|---|
| 2012/0166616 A1 | 6/2012 | Meehan et al. |
| 2014/0040979 A1 | 2/2014 | Barton et al. |

OTHER PUBLICATIONS

Eddy, "Extending the Space Available for TCP Options draft-eddy-tcp-loo-04", Jul. 1, 2008 (36 pages).

Ellis, et al., "An Experimental Study of Client-Side Spotify Peering Behavior", Local Computer Networks (LCN), 2011 IEEE 36th Conference on. IEEE, 2011 (4 pages).

https://github.com/boundary/ordasity/blob/master/Readme.md, downloaded Jun. 3, 2014 (6 pages).

Jaiswal, et al. "Inferring TCP Connection Characteristics through Passive Measurements." 2004 (11 pages).

Kohler, "Extended Option Space for TCP", Sep. 19, 2004 (15 pages).

Ramaiah, "TCP Option Space Extension draft-ananth-tcpm-tcpoptext-00.txt", Mar. 25, 2012 (40 pages).

Veal, et al., "New methods for passive estimation of TCP round-trip times." Passive and Active Network Measurement. Springer Berlin Heidelberg, 2005. 121-134 (14 pages).

Zookeeper.apache.org, downloaded Jun. 3, 2014 (2 pages).

U.S. Appl. No. 15/809,380, filed Nov. 10, 2017, Allowed.

U.S. Appl. No. 13/900,441, filed May 22, 2013, Granted (now U.S. Pat. No. 9,819,729).

APPLICATION MONITORING FOR CLOUD-BASED ARCHITECTURES

CROSS-REFERENCE TO RELATED APPLICATIONS

The present application is a continuation of, and claims priority to, U.S. patent application Ser. No. 15/809,380, filed on Nov. 10, 2017 (now U.S. Pat. No. 10,171,565), which is a continuation of, and claims priority to, U.S. patent application Ser. No. 13/900,441, filed on May 22, 2013 (now U.S. Pat. No. 9,819,729), which claims the benefit of U.S. Provisional Patent Application Ser. No. 61/745,406, filed on Dec. 21, 2012 and U.S. Provisional Patent Application Ser. No. 61/806,863, filed on Mar. 30, 2013, the disclosures of all of which patent applications and patents are incorporated by reference herein in their entireties.

BACKGROUND

The present disclosure relates to monitoring the operation of applications hosted on cloud-based architectures. In particular, the present disclosure relates to systems and methods for monitoring the operation of applications that operate in cloud environments.

The use and proliferation of software, platform, infrastructure services that are distributed over the cloud, such as Software as a Service (SaaS), Platform as a Service (PaaS), Infrastructure as a Service (IaaS), have become increasingly popular. While these services have vastly simplified the process of deploying and scaling applications, particularly complex ones, they present very challenging problems when it comes to monitoring the performance of applications deployed using these cloud-based services/platforms. For example, it is generally very difficult to monitor the performance of the applications and the hardware resources they utilize in real-time because access to performance information for the cloud platform components is generally very limited. For example, little information about how the servers, storage, and networking systems of the cloud-based architecture is often even available or accessible to a customer that is using it to host an application, so it can be difficult and/or impossible to determine whether the user's application or the cloud-based architecture is the source of any performance issues, bottlenecks, or downtime. Moreover, any performance information that is available is often limited, stale, and/or sampled down so it doesn't provide a complete or detailed enough picture of any issues that may arise.

Further, applications deployed on these highly distributed computing services are often very complex and dynamic. However, these computing services provide little visibility over major parts of their stacks (e.g., layers 1-3). In addition, because IT staff may not have access to the underlying hardware and systems of these computing services, they are unable to effectively monitor these devices for issues. Consequently, when issues arise, the IT staff often struggle to find answers to critical questions such as what the impact to their customers will be, when they can expect to run out of capacity, whether the issue is a network or application issue, what the root cause of issue is, and what the priority or impact of the issue is.

In addition, existing application performance monitoring solutions, including dedicated networking devices and appliances, have had difficulty adapting to monitoring applications on these cloud-based services. This is due in part to the dynamically changing infrastructure, the distributed architecture, and the different languages and/or services offered by the cloud-based services, which require constant reconfiguration of the existing solutions. In addition, existing solutions can themselves contribute to latency and bottlenecks because they require network traffic be specifically routed through them so they can take data samples. As a result, traditional application performance monitoring solutions have generally been unable to provide effective and efficient monitoring of applications deployed via these cloud-based services.

Thus there is a need for a solution that provides real-time, informative, and comprehensive application performance monitoring on cloud-based services.

SUMMARY

The present disclosure overcomes the deficiencies and limitations of the background solutions at least in part by providing a technology for monitoring application performance.

According to one innovative aspect, an example system may include one or more collectors, an analyzer, and a presentation module. The one or more collectors receive a plurality of data streams that include operational data for a plurality of application nodes. The plurality of data streams are captured and provided by a plurality of meters deployed on at least one cloud computing platform to respectively meter the plurality application nodes. The analyzer processes the plurality of data streams to generate real-time performance data for an application associated with the plurality of application nodes. The presentation module streams the real-time performance data to at least one stakeholder of the application for display via a dashboard. The real-time performance data includes one or more performance metrics describing the performance of plurality of the application nodes of the application.

In another innovative aspect, an example method may include receiving a plurality of data streams that include operational data for a plurality of application nodes, the plurality of data streams captured and provided by a plurality of meters deployed on at least one cloud computing platform to respectively meter the plurality application nodes; processing the plurality of data streams to generate real-time performance data for an application associated with the plurality of application nodes; and streaming the real-time performance data to at least one stakeholder of the application for display via a dashboard, the real-time performance data including one or more performance metrics describing the performance of plurality of application nodes of the application.

Various embodiments of these and other innovative aspects may include corresponding systems, apparatus, and computer programs, configured to perform the actions of the methods, encoded on computer storage devices.

The embodiments and/or examples described herein are particularly advantageous in a number of respects including, for example, providing application performance monitoring (APM) across one or more cloud computing platforms in real-time; enabling customers to easily monitor and quickly monitor and improve application performance; enabling customers with business-critical services deployed in cloud or hybrid IT infrastructures to ensure that these services have optimal performance and uptime; delivering the application performance monitoring data via (SaaS) so customers may monitor their applications without having to procure, install, or maintain any additional hardware; providing an accurate, real-time picture of network configurations and topologies which dynamically captures and shows changes as they occur; providing performance data for applications hosted on private, public, and/or and hybrid cloud infrastructures regardless of whether the customers can access the underlying infrastructure; tracking distributed applications in any cloud environment; leveraging high frequency (e.g., per second) updates to immediately alert users of abnormalities signifying application, configuration, security issues, etc., to prevent those problems from leading to outages; providing real-time alerts to users when configuration changes occur (e.g., to prevent migrations or other changes from escalating and affecting users); monitoring dynamic public cloud environments effectively in real-time; providing insights needed to identify misconfigured networks and DNS tables, chatty nodes, security attacks, etc.; enabling users to boost application performance using lightning fast problem resolution; and rapidly directing users to root causes of problems so issues can be resolved before they affect end-users. It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Cloud computing platforms provide a number of benefits to users including lowering the barriers of entry for new client focused services, lowering the price of computing power, and fostering creativity and collaboration by focusing services offered by the platforms on customer experience. Business applications built on these cloud computing are often complex, constantly changing, highly distributed, customer-centric solutions, which require developer agility and a rapid pace of change.

The novel application monitoring technology described herein can assist users (e.g., IT staff, developers, application owners, etc.) in addressing a range of challenges that known solutions are unable to contend with. For instance, the application monitoring technology can monitor applications deployed in public cloud environments even though the applications may not have a fixed software or hardware footprint; the application topology may dynamic and services may be shared; multiple languages and highly distributed systems/hardware may be used; time-stamping provided by the cloud computing providers may not be controllable and/or may contain inconsistencies/irregularities (e.g., include out of order events), etc. In particular, the application monitoring technology includes systems and methods for monitoring an application and its dependencies in real-time, regardless of the infrastructure or languages used, and to automatically build and update a logical application topology and makes it fast and easy to identify the location and source of issues and bottlenecks.

Figure 1:
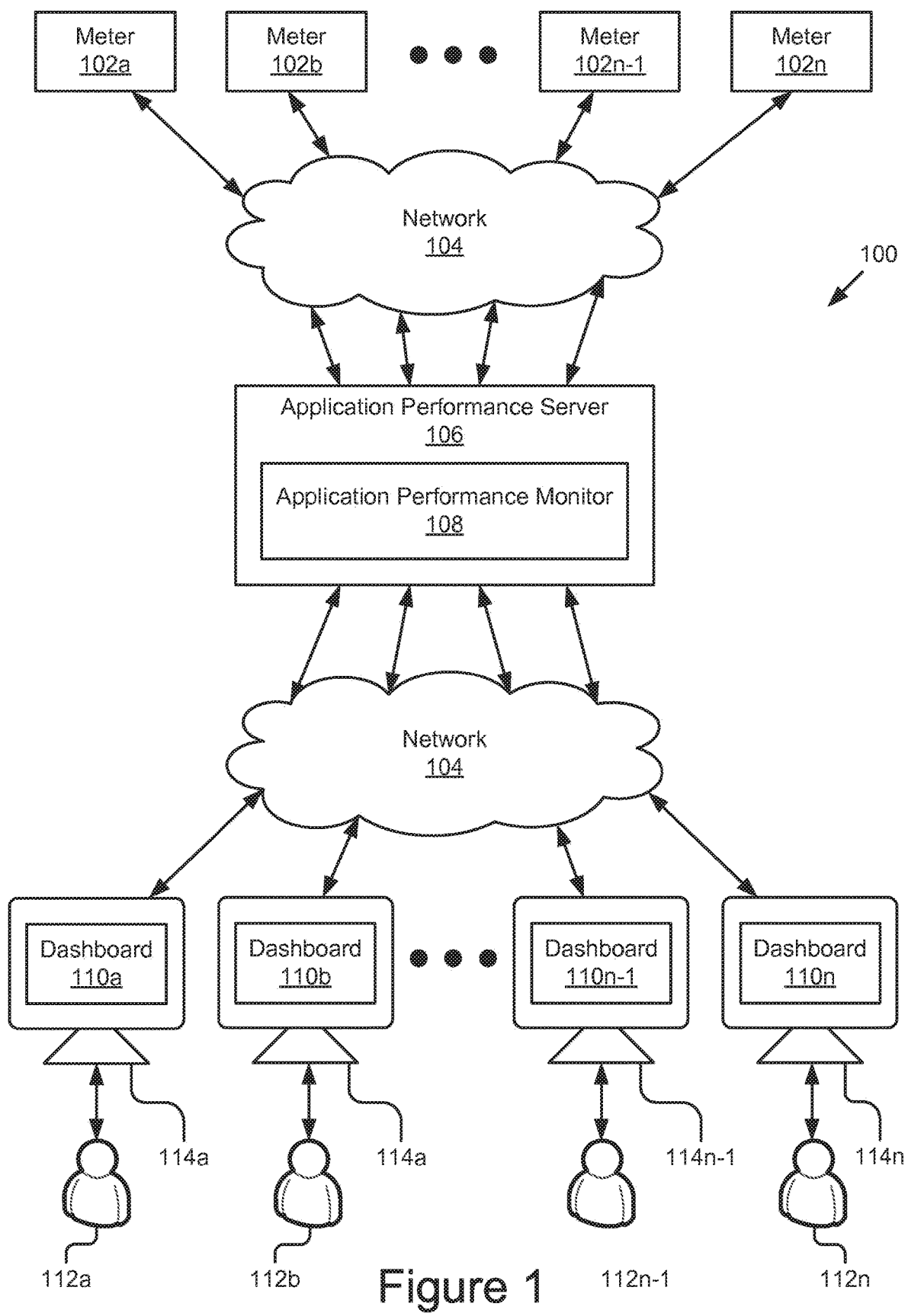
FIG. 1 is a block diagram of an example application performance monitoring system.

FIG. 1 is a block diagram illustrating one such example system 100 for application performance monitoring (APM). The system 100 includes a plurality of agents/meters 102a . . . 102n (also referred to herein individually or collectively as 102), a network 104, an application performance monitor 108, and a plurality of dashboards 108a . . . 108n (also referred to herein individually or collectively as 108). The meters 102a . . . 102n are executable to monitor applications hosted on various cloud computing platforms/distributed computing systems (e.g., see FIG. 3). The meters 102a . . . 102n may be coupled to the application performance monitor 108 via the network 104 to provide streams of real-time information about the operational performance of the applications and the hardware and/or software, etc., being used by the applications. The application performance monitor 108 may receive streams of real-time information from a plurality of meters 102a . . . 102n and group, process, and/or aggregate the information for presentation on one or more dashboards 108a . . . 108n. As used herein, real-time means that data being metered, collected, analyzed, and streamed to the users is processed as rapidly as possible (e.g., within seconds, fractions of seconds, etc.) to provide the user with a substantially contemporaneous experience. For instance, the application performance monitor 108 may process and relay the operational data to the dashboards 110 within seconds or fractions of seconds of when the corresponding applications perform the operations.

The structure, acts, operation, and/or functionality of the application performance monitor 108 are described in more detail below and with reference to at least FIG. 2. The dashboards 108a . . . 108n are presented on customer client devices 114a . . . 114n (also referred to herein individually or collectively as 114) so that they may review the operation of the software, applications, hardware, and/or systems being used across the various cloud computing platforms. Non-limiting examples of the operational and performance data and/or user interfaces that may be rendered and displayed by a given dashboard 108 are illustrated in FIGS. 12A-12G.

The network 104 may include any number of networks. For example, the network 104 may include, but is not limited to, public and private networks, local area networks (LANs), wide area networks (WANs) (e.g., the Internet), virtual private networks (VPNs), mobile (cellular) networks, wireless wide area network (WWANs), WiMAX® networks, Bluetooth® communication networks, various combinations thereof, etc.

The client devices 114a . . . 114n are computing devices having data processing and communication capabilities. In some embodiments, a client device 114 may include a processor (e.g., virtual, physical, etc.), a memory, a power source, a communication unit, and/or other software and/or hardware components, such as a display, graphics processor, wireless transceivers, keyboard, camera, sensors, firmware, operating systems, drivers, various physical connection interfaces (e.g., USB, HDMI, etc.). The client devices 114a . . . 114n may couple to and communicate with one another and the other entities of the system 100 via the network 104 using a wireless and/or wired connection.

Examples of client devices 114 may include, but are not limited to, mobile phones, tablets, laptops, desktops, netbooks, server appliances, servers, virtual machines, TVs, set-top boxes, media streaming devices, portable media players, navigation devices, personal digital assistants, etc. While four or more client devices 114 are depicted in FIG. 1, the system 100 may include any number of client devices 114. In addition, the client devices 114a . . . 114n may be the same or different types of computing devices.

Figure 2:
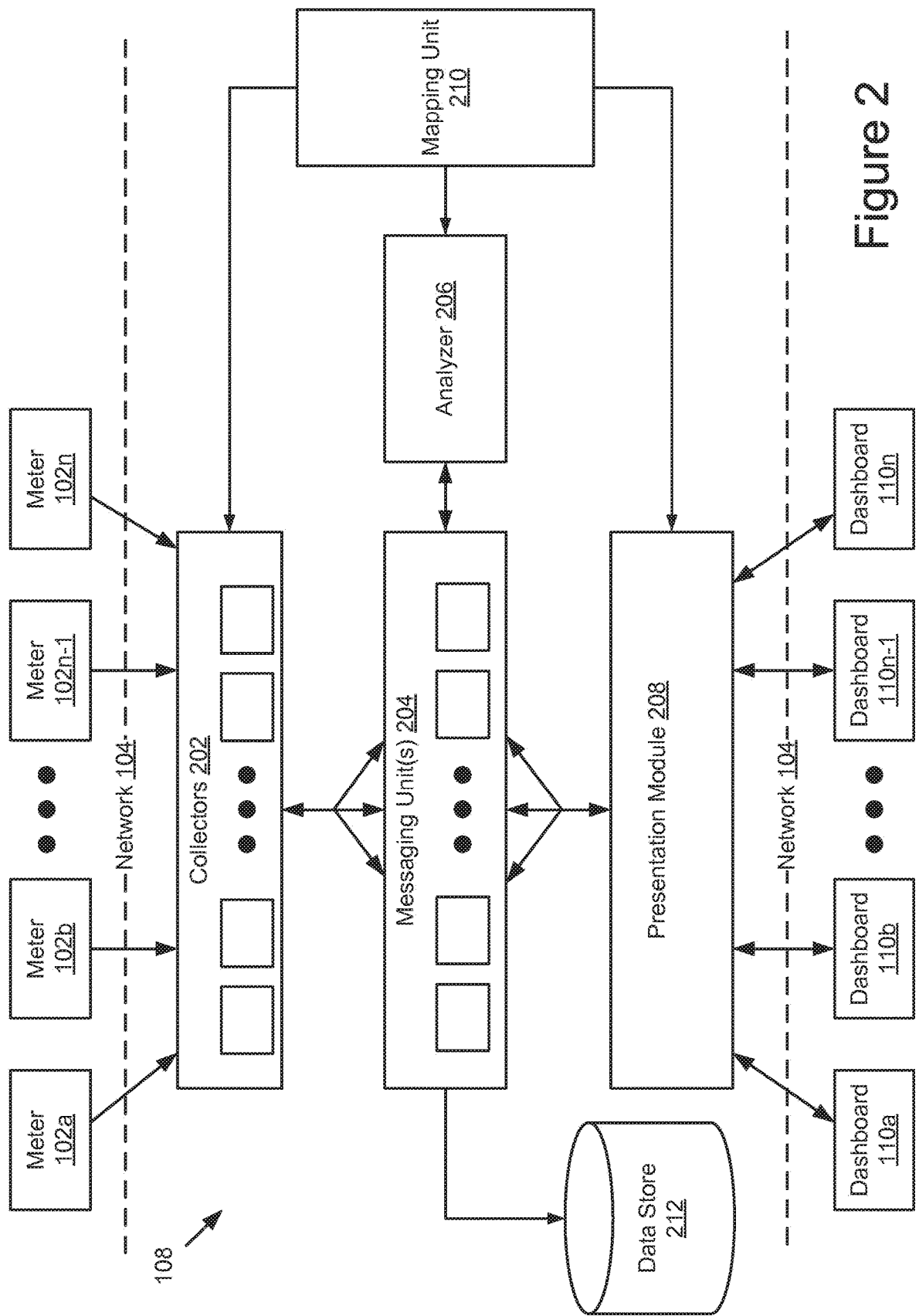
FIG. 2 is a block diagram of an example application performance monitor

FIG. 2 is a block diagram of an example application performance monitor 108, which includes a plurality of collectors 202, a plurality of messaging units 204, an analyzer 206, a presentation module 208, a mapping unit 210, and a data store 212. The plurality of collectors 202 may be coupled to receive operational data streams in real-time from the plurality of meters 102a . . . 102n. For example, the plurality of collectors 202 may be connected via a network 104, such as a public and/or private network(s), to the plurality of meters 102a . . . 102n. More specifically, any individual collector 202 may be coupled to receive data from a single meter 102 or more than one meter 102. The plurality of meters 102a . . . 102n are each operable on a computing system, such as but not limited to a public or private cloud computing platform, a hybrid IT infrastructure including cloud-based and local computing assets, etc., and may collect information about the operations of an application, such as its performance and the performance of the hardware resources utilized by that application, on that system.

For clarity, the information collected/captured and processed by the meters 102, such as the information discussed in detail herein, is sometimes referred to herein as operational data. The meters 102 may capture operational data on a continual basis in real-time and sent to the collectors 202 once every second. It should be understood that the meters 102 can send the information to the collectors 202 at various other intervals. The meters 102 may be operable as software agents to capture the operational data.

In some embodiments, the meters 102 may continuously capture network data sent and received by server instances hosting the applications being metered by the meters 102. The network data may include packet information, NIC information, port and protocol information, etc. For example, the meters 102 may capture and process network data, such as source IP addresses, source protocols, port numbers, destination IP addresses, destination protocols, destination ports, round-trip time (RTT) metrics, TCP flow metrics, latency, etc.

In some embodiments, the RTT metrics may include various different types of RTT measures for TCP connections including but not limited to RTT measurements taken while a connection is being opened (also referred to as TCP Handshake RTT) and RTT measurements taken during the lifetime of the connection (also referred to as App RTT), if enough information is present in the TCP headers. These RTT measurements may be zeroed if not relevant. For example, both of these measurements for flows of UDP traffic may be zeroed, and the App RTT measurements for flows of TCP traffic without TCP timestamp options may be zeroed. In some embodiments, these RTT measures may be passively captured (e.g., based on existing traffic and not traffic initiated by the meter 102).

The TCP Handshake RTT metric may include a one-shot measurement taken once per TCP connection. For example, the meter 102 may identify a new connection from the TCP flags set in packet headers during a handshake (e.g., SYN/SYN+ACK/ACK three-way handshake) and may capture timestamps taken as these packets are exchanged to determine the distance (in time) between the meter 102 and both the client and the server. In some instances the meter 102 may be running on an end host and the distance to one side will be practically zero.

By way of example and not limitation, given two hosts A and B, a meter 102 may capture the following sequence of packets: A→B (SYN) B→A (SYN+ACK) A→B (ACK). The time difference between when the ACK is observed and when the SYN is observed by the meter 102 may represent one full RTT. In some instances, the TCP Handshake RTT measurement may be taken once; exported from the meter 102 once during the lifetime of a connection; and set to zero at all other times. In some instances, on TCP connections opened prior to the flow being observed, this metric may not be available and may be set to zero.

The App RTT metric may include estimates of round-trip times by monitoring the traffic flows generated by an application, or rather, an active TCP connection. The meter 102 can estimate network RTT when data is being exchanged on a TCP connection. Some traffic patterns may indicate bad application performance and these traffic patterns can be surfaced and identified to the application owner. In some embodiments, some application types may exhibit different behaviors for this metric and some normal application behavior may offer more stable RTT measures than others. Therefore, different sets of applications running between the same two hosts may show different RTT values using this metric, depending on the networking protocols being used and how they work. In other embodiments, behaviors may be the same or substantially similar for applications.

By way of example and not limitation, given two hosts A and B, a full cycle may be needed for one full App RTT sample, i.e., two packets may have to pass in the same direction to complete the round trip, as illustrated by:

A->B
B->A
A->B or:

B->A
A->B
B->A.

The App RTT metric is advantageous as it can inform users of whether bufferbloat is present in the network traffic which can indicate bad network health, and can inform users of whether the network traffic being exchanged by an application is within acceptable parameters, such as applications supporting real-time communications which may require RTT metrics that are consistently be under a 200-300 hundred milliseconds. Consistent App RTT metrics may indicate stability for such real-time communications. Further, averaged App RTT metrics can help identify the highly latent network paths of an application.

Patterns in the App RTT metric values may be analyzed by the analyzer 206 to infer normal and abnormal application behavior, and whether changes in the metric values are due to network issues, network stack, and/or application issues. In some embodiments, the analyzer 206 may determine that a consistent change in App RTT metric values may imply a network reconfiguration and may inform a stakeholder of such. For example, between two hosts, the change in the App RTT metric values could imply a failed router or a genuine network reconfiguration the stakeholders of the application were previously unaware of. In another example, between two networks, the change in the RTT metric could indicate a change in network routing (e.g., BGP, new peering relationships, etc.), an uplink outage (e.g., a failover), routing around an expected problem (e.g., a mouse biting through fiber, a catastrophic hardware failure; an inadvertently severed network cable or deep-sea fiber, etc.).

In some embodiments, the analyzer 206 may determine that an inconsistent or less-consistent change in the App RTT metric values may imply that a possible problem exists above the network, such as a machine paging heavily, an application locking up and not always responding immediately (e.g., due to a software bug, bad design, etc.), a malicious act (e.g., a network stack combatting a (D)DOS), etc. However, the analyzer 206 may be adapted to account for variances that may be inherent in various types of data exchanges, such as interactive SSH sessions.

TCP flow metrics captured, processed, and/or streamed by the meters 102 may include the number of retransmitted packets sent and received including the delta, the number of reordered packets sent and received including the delta, the TCP flags sent and received, which can be an inclusive or limited to observed flags in the current capture interval (e.g., in the last second). The meters 102 may meter the TCP flow by data flow. The TCP flow metrics may be correlated with other meter semantics, such as per-flow deltas, that may be streamed by the meters 102 at regular frequencies (e.g., once per second)).

Packets may be retransmitted if they have not been acknowledged within a predetermined timeframe. Packets may be lost/dropped for a variety of reasons. For instance, network routers may drop packets if their buffers are full or possibly before buffers are full to help TCP stacks back off sooner, packets may corrupt in transit and may be rejected if their checksums do not match the payload, misconfigured network hardware may erroneously drop packets or may occasionally route packets down the wrong network path.

Some small amounts of packet retransmissions in a network are normal and expected. However, if elevated rates are detected, the analyzer 206 may analyze these elevated rates to infer what the issues may be. For example, if there are abnormally high retransmission counts in several (e.g., three or more) flows with one host in common, then the analyzer 206 may determine that there is a problem with this host, its NIC, and/or other physical hardware connecting the host to the network. In another example, if there are abnormally high retransmission counts in several (e.g., three or more) flows with no common host, then the analyzer 206 may determine that there is a congested link or a congested router in the network, which may be further confirmed by the analyzer 206 with data from other segments along the congested data path. In a further example, if there are abnormally high retransmission counts in several (e.g., three or more) flows within a common autonomous system, then the analyzer 206 may determine that there is misbehaving/congested hardware within that autonomous system, and that network performance for some/all hosts within that autonomous system may be affected.

Packets can be reordered in-transit in the presence of network reconfiguration (routing algorithm affecting selected paths) or in some cases when traffic is actively being load-balanced across multiple links. Like retransmits, some small amounts of reordered packets are normal. However, elevated reordering may be analyzed by the analyzer 206 to identify root causes and/or may be reported to a stakeholder via a dashboard 118 for further investigation.

The directional TCP flags may be captured and bundled by the meter 102 into the appropriate ingress or egress per-flow metrics. Using the captured TCP flags sent and received in the flows, the meters 102 can bookend the data connections and determine their connection state. For instance, for a given connection, the meter 102 can determine connection opens (e.g., SYN/SYN+ACK/ACK), connection close (e.g., FIN), connection reset (e.g., RST). The connection state can be analyzed by the analyzer 206 to determine the number of open connections at each host; connection lifetimes; frequency of new connection formation/old connection teardown; data volume against connection lifetime; etc., which can further be used by the analyzer 206 to identify problematic hardware (e.g., networking, host, etc.). As further examples, the analyzer 206 may determine that a TCP RST from an unknown location indicates a misconfigured server or naming; a TCP RST that occurs during a connection indicates regular application behavior, implies a service has terminated, or implies a host has become disconnected; a flurry of RSTs indicates that malicious processes exists or machine(s) have restarted; and a consistently high RST flag count indicates a misconfiguration. In addition, the analyzer 206 may determine that a significant increase in connections may indicate the spread of a virus or worm, or of an attack ((D)DOS). In some embodiments, the analyzer 206 may analyze timed-out connections to identify whether a badly configured firewall is to blame. For instance, to determine whether a firewall timed out a connection, the analyzer 206 may look for a series of retried packets from one end of the connection and determine whether this retransmission was followed by an attempt to reconnect by the application.

In some embodiments, meters 102 may be installed and monitor applications at both ends of a data connection/flow, which allows stakeholders to receive real-time detailed performance data that includes the state of the TCP stack for both ends of the connection. The meters 102 can also capture and stream total SYN/FIN/RST counts observed on a given flow, which the analyzer 206 can use to characterize the overall health of the flow.

In some embodiments, a meter 102 may timeout flows/connections if they are idle too long (e.g., 30 seconds) to prevent the meter 102 from consuming too many computing resources (e.g., space, processing cycles, etc.) by tracking all flows/connections. A meter 102 may include an indication in the data stream being sent to the application performance monitor 108 indicating why a given flow is no longer being metered. For instance, the meter 102 may set and provide a flowEndReason attribute using one of the following: idle timeout, active timeout, end of flow detected (e.g., FIN), forced end (e.g., meter shutdown), lack of resources (e.g., in meter), etc., to indicate why the meter 102 has abandoned a flow.

The meters 102 may stream the operational data collected and processed by them to the application performance monitor 108 for further analysis, storage, and/or provision to users 112a as dashboard data. In some embodiments, the collectors 202 may act as buffers for receiving and collecting the information streamed by the meters 102. For example, the plurality of collectors 202 of the application performance monitor 108 may buffer the information received from the meters 102 until that information can be sent/pass on to the messaging units 204 for further processing. For example, the collectors 202 may provide a buffer of several seconds or minutes so that if a messaging unit 204 fails, the processing of the information from a given collector 202 can be recovered and processed by another messaging unit. One particular advantage of the application performance monitor 108 is that it includes a plurality of collectors 202 and thus the number of collectors 202 can be scaled according to the demands and number of meters 102 deployed. The operation of the collectors 202 may be controlled by the mapping unit 210, which may identify the meter(s) 102 with which a given collector 202 is associated and also the message unit(s) 204 with which a given collector 202 is associated.

In some embodiments, the data streams being collected may be efficiently stored and indexed in the data store 212 in a manner that preserves the full-resolution (e.g., all dimensions of the data) in a cost effective manner. This is advantageous because the amount of data received from all of the meters 102 is theoretically immense and without indexing it would be impracticable to store the data at full-resolution for all of the users. In some embodiments, when being collected, the data streams may be cached in memory and processed on separate paths based on resolution level (e.g., per second, minute, hour, day) in parallel so each level of data may be immediately queried and/or provided for display. Once processed, each level may be pushed out to the data store 212 for storage. In some embodiments, the data streams may be queried using online analytical processing (OLAP).

The plurality of messaging units 204 may be coupled to the plurality of collectors 202 to receive the operational data being streamed from the meters 102. The messaging units 204 may process the operational data by at least organizing and grouping the data being received by application using one or more criteria (e.g., user/customer, application, organization, etc.).

Figure 12A:
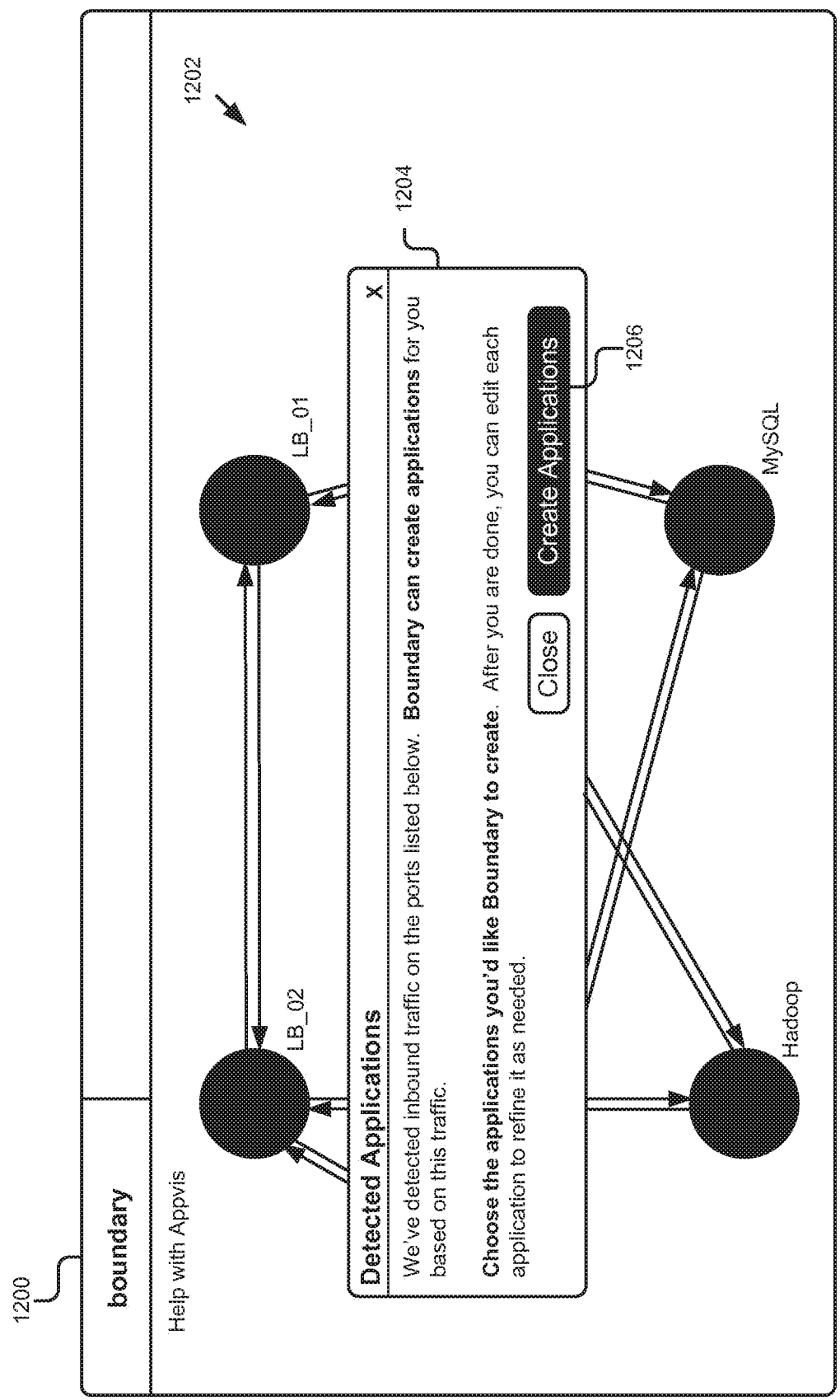
FIGS. 12A-12G are graphical representations of example user interfaces generated by the system for application performance monitoring.

The application may be automatically defined by the application performance monitor 108, may be suggested by the application performance monitor 108 to a user for definition, maybe user-defined, etc. For example, the mapping unit 210 may detect that a new data stream of operational data is being collected by a collector 202 for an application that has not yet been defined by a customer and may flag the data stream accordingly in the data store 212. The presentation module 208 may then notify the customer about the new data stream via the dashboard 210 and the customer may input information about the data stream including which application the data stream should be associated with. A non-limiting example user interface for notifying a user about a new data stream is depicted in FIG. 12A, and discussed in further detail below.

The messaging units 204 may provide the processed operational data to the analyzer 206 for further analysis and/or provide it to the presentation module 208 to be processed for presentation via the dashboards 118. By way of further example, a given messaging unit 204 may receive operational data from one or more collectors 202; organize and group the data; send the grouped data (or data processed therefrom) to the analyzer 206 for further analysis; receive the analyzed operational data (also referred to herein as performance data) from the analyzer 206; further group and/or organize the performance data; send the performance data from the analyzer 206 for processing and output by the presentation module 208; and/or provide the operational and/or performance data to the data store 212 for long term storage. In some embodiments, the messaging units 204 may each be assigned to process data streams from a set of one or more collectors 202. The operation of the messaging units 204 may be controlled by the mapping unit 210 and may determine which collectors 202 the messaging units 204 are mapped to.

The messaging units 204 may be coupled to the analyzer 206 to send and receive information. The messaging units 204 may be coupled to the presentation module 208 to send information for the creation and presentation of the dashboard. The messaging units 204 may be coupled to the data store 212 for sending processed information for long-term storage and retrieving information. The messaging unit 204 may provide information to the analyzer 206 and the presentation module 208. The operations of the messaging unit 204 may be controlled by the mapping unit 210.

The analyzer 206 may be coupled to receive information from the messaging units 204 and perform further analysis and processing. The operations of the analyzer 206 may be controlled by the mapping unit 210. In some embodiments, there may be multiple analyzers 206 over which the workload of the application performance monitor 108 may be distributed, and particular messaging units 204 may be assigned by the mapping unit 210 to cooperate and interact with certain analyzer 206 units. In some embodiments, the analyzer 206 may analyze the operational data of a given application to generate a rich set of performance metrics that can be used by stakeholders to gauge the performance of the application. For example, the analyzer 206 may process performance metrics provided by the meters 102 to determine whether the application is operating within parameters; highlight and/or trigger alerts for various metrics or combinations thereof are not within parameters; automatically identify software or hardware that may causing performance issues; automatically generate an application topology for the application showing the hardware and software resources included in and/or being used by the application and the data flows between those resources; generate graphs; determine graph dependencies; generate performance trends by comparing historical data to the real-time data; generate performance metrics over different time frames (e.g., real-time, over past 24 hours, over past week, month, year, etc.); surface problematic metrics; and/or further bucket, group, organize, and/or filter the metrics and/or data streams. By way of further example, the analyzer 206 may use packet, host, and other data included in the data streams captured by the meters 102 of the application to identify application nodes, server instances, operating systems, software, storage devices, networking hardware, services, etc., being used by the application and characterize the data flows between those items as health or unhealthy using metrics derived from the network packet data from those flows such as latency, protocol, RTT, etc. After processing, the analyzer 206 may provide the operational data it processes back to the messaging units 204 for subsequent distribution to the presentation module 208.

The mapping unit 210 may control the operation of the collectors 202, the messaging units 204, and the analyzer 206. The mapping unit 210 may be coupled to the collectors 202, the messaging units 204, and the analyzer 206 as described above and shown in FIGS. 2 and 3. In some embodiments, the mapping unit 210 may be configured to use an orchestration layer, such as Ordasity by Boundary, Inc., which can facilitate the building and deployment of reliable clustered services. The orchestration layer ensures that the data being aggregated data in one tier (e.g., by the collectors 202) may be extremely rapidly processed (e.g., hundreds of megabits per second) in another tier (e.g., the messaging units 204, analyzer 206, etc.). The orchestration may also be configured to keep track of and maintain the mappings between the components of the application performance monitor 108. Further, the orchestration layer may be configured to spread and balance the aggregating by the collectors 202 and event stream processing by the messaging units 204 and/or the analyzer 206 across any number of nodes to ensure even distribution and fluid hand-offs as the workloads change, and may deploy updates without disrupting operation of the cluster. The orchestration layer may be configured to use a coordination layer for controlling and/or coordinating the processing provided by the collectors 202, the messaging units 204, and the analyzer 206, etc. The coordination layer may be implemented using Apache Zookeeper™ to maintain configuration information, naming, providing distributed synchronization, and provide group services, although other coordination layer solutions may be used as well.

The presentation module 208 may be coupled to the messaging units 204 and configured to create and provide relevant information about the operation of applications for presentation. The presentation module 208 may be coupled to receive information from the messaging units 204 and process and/or provide the information on the client devices 114 of the users on graphically and informationally rich dashboards 110, which the users 112 can use to view an application's topology from end to end, view information flows being sent and received by the application and its sub-components, etc., as discussed in further detail elsewhere herein. The presentation module 208 may stream the performance data to the dashboards 110 and may perform user authentication to ensure secure access to the performance data. One advantage of the presentation module 208 is that it can transform the performance data streams being collected, grouped, organized, and/or analyzed by the application performance monitor 108 into visually and graphically rich application performance data streams and provide them to users in real-time to the dashboards for display to the users 112 on the dashboards 110. In some embodiments, the presentation module 208 may maintain an open connection to the dashboards 110 to provide the information in real-time. The presentation module 208 may be coupled to the dashboards 108 as shown in FIGS. 1 and 2.

The dashboards 110 may be displayed to the customers/users 112 on their client devices 114 so that they may review the operation of the software, applications, and systems deployed across distributed network 104. In some embodiments, the information provided by the presentation module 208 may be transmitted as web pages which include the dashboards 118, and client applications (e.g., web browsers) operable on the client devices 114 may interpret and display the web pages to the users 112. In other embodiments, some or all of the visual and/or graphical formatting of the performance data may be performed on the client device 114 and the dashboard 118 may be included in a native client application 118 (e.g., an app from an application marketplace) installable on the client device 114 and operable to format and render the performance data being received from the presentation module 208 for display. Non-limiting examples of user interfaces rendered for display by the dashboard 118 in cooperation with the application performance monitor 108 are shown in FIGS. 12A-12G. In some embodiments the dashboards 100 may include crowd-sourcing capabilities that allow customers to collaborate and work on shared performance issues to identify root problems.

Figure 3:
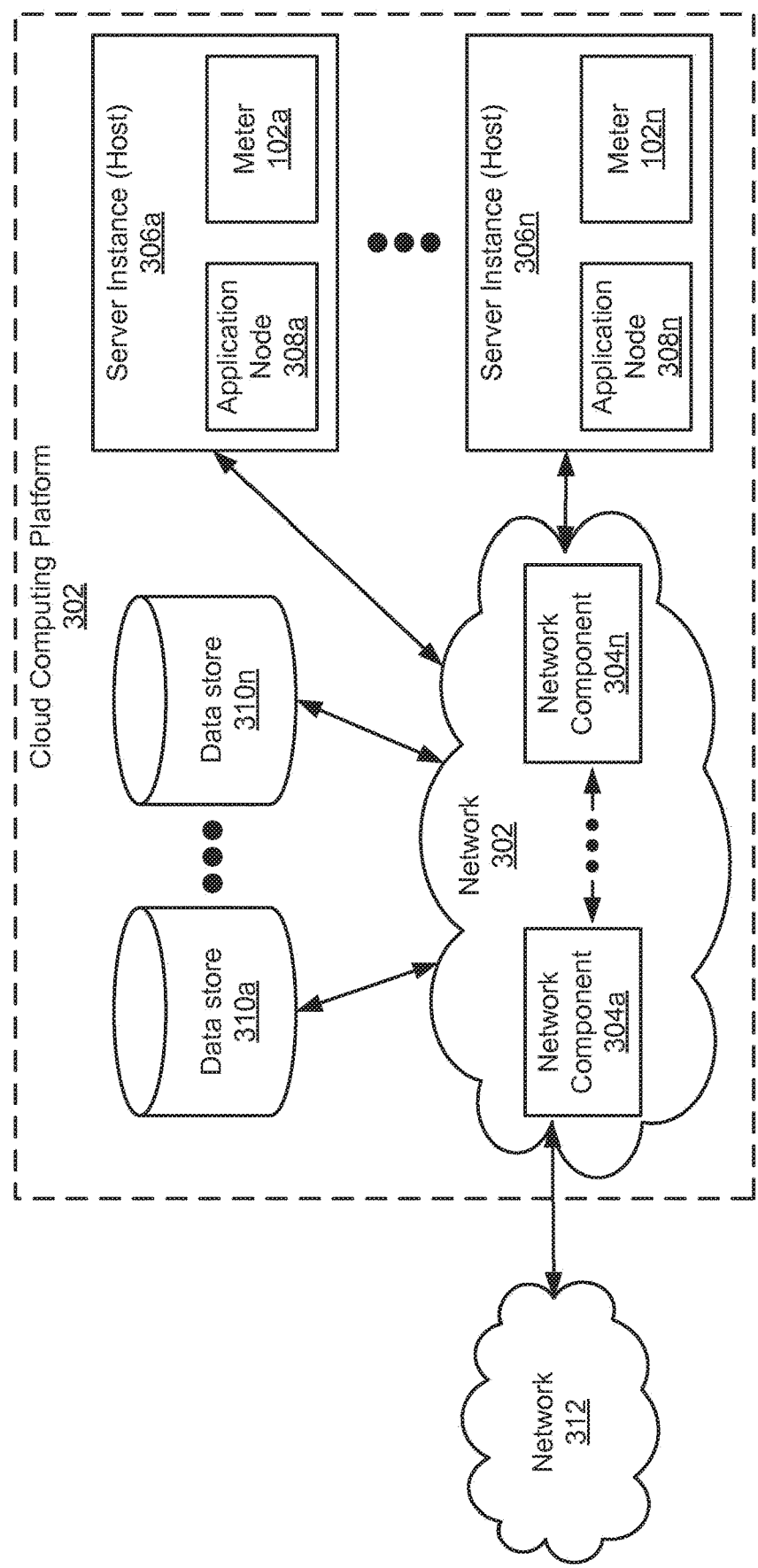
FIG. 3 is a block diagram of an example cloud computing platform that includes example server instances having example meters installed.

FIG. 3 is a block diagram of an example cloud computing platform 302 that includes example server instances 306 having example meters 102 installed. The cloud computing platform 302 is a computing system capable of providing application, platform, and/or infrastructure services to other entities coupled to the network 104. Examples of services provided by the cloud computing platform 302 may include, but are not limited to, scalable hardware architecture, scalable software frameworks, solution stacks, middleware, data storage, physical and/or virtual machines, runtime environments, load balancers, computer networks, data computation and analysis, application development and hosting, etc. The system 100 may include any number of cloud computing platforms 302.

As depicted, the cloud computing platform 302 may include a network 302, a plurality of server instances 306a . . . 306n (also referred to individually and collectively as 306), and a plurality of data stores 310a . . . 310n (also referred to individually and collectively as 310). The networks 302 and 312 are computer networks that form at least part of the network 104 depicted in FIG. 1. The network 302 may include private and/or public computer networks for the components (e.g., 304,306,310, etc.) of the cloud computing platform 302. The network 302 may also be connected to the network 312 (e.g., the Internet) so that the cloud computing platform 302 and its components may communicate with the other entities of the system 100.

The network 302 may include a plurality of network hardware and software components 304a . . . 304n necessary for the components of the cloud computing platform 302 to communicate. For example, the network 302 may include DNS servers, firewall servers, routers, switches, etc., server instances 306a . . . 306n, data stores 310a . . . 310n, etc.

A server instance 306 may include one or more computing devices having data processing, storing, and communication capabilities. For example, a server instance 306 may include one or more hardware servers, virtual servers, server arrays, storage devices and/or systems, etc. As depicted in FIG. 3, the server instances 306a . . . 306n may respectively include application nodes 308a . . . 308n (also referred to individually and collectively as 308) and meters 102a . . . 102n. The server instances 306a . . . 306n may share various resources of the cloud computing platform 302 including storage, processing, and bandwidth to reduce the overall costs needed to provide the services. The meters 102 may monitor the application nodes 308 and the components of the cloud computing platform 302 and other components of the system that the application nodes 308 communicate with. Although each server instance 306 is depicted as include one application node 308 and meter 102, it should be understood that each may include multiple application nodes 308 and/or meters 102.

The data stores 310 are information sources for storing and providing access to data and may be coupled to, receive data from, and provide data to the server instances 306. The application nodes 308 and the meters 102 may store data in the data store 310 for later access and retrieval. The data stores 310 may store data as files in a file system, as entries in a database, etc. In some embodiments, the data stores 310 operate one or more database management system (DBMS), such as a structured query language (SQL) DBMS, a NoSQL DMBS, various combinations thereof, etc. In some instances, the DBMS may store data in multi-dimensional tables comprised of rows and columns, and manipulate, i.e., insert, query, update and/or delete, rows of data using programmatic operations.

Figure 4:
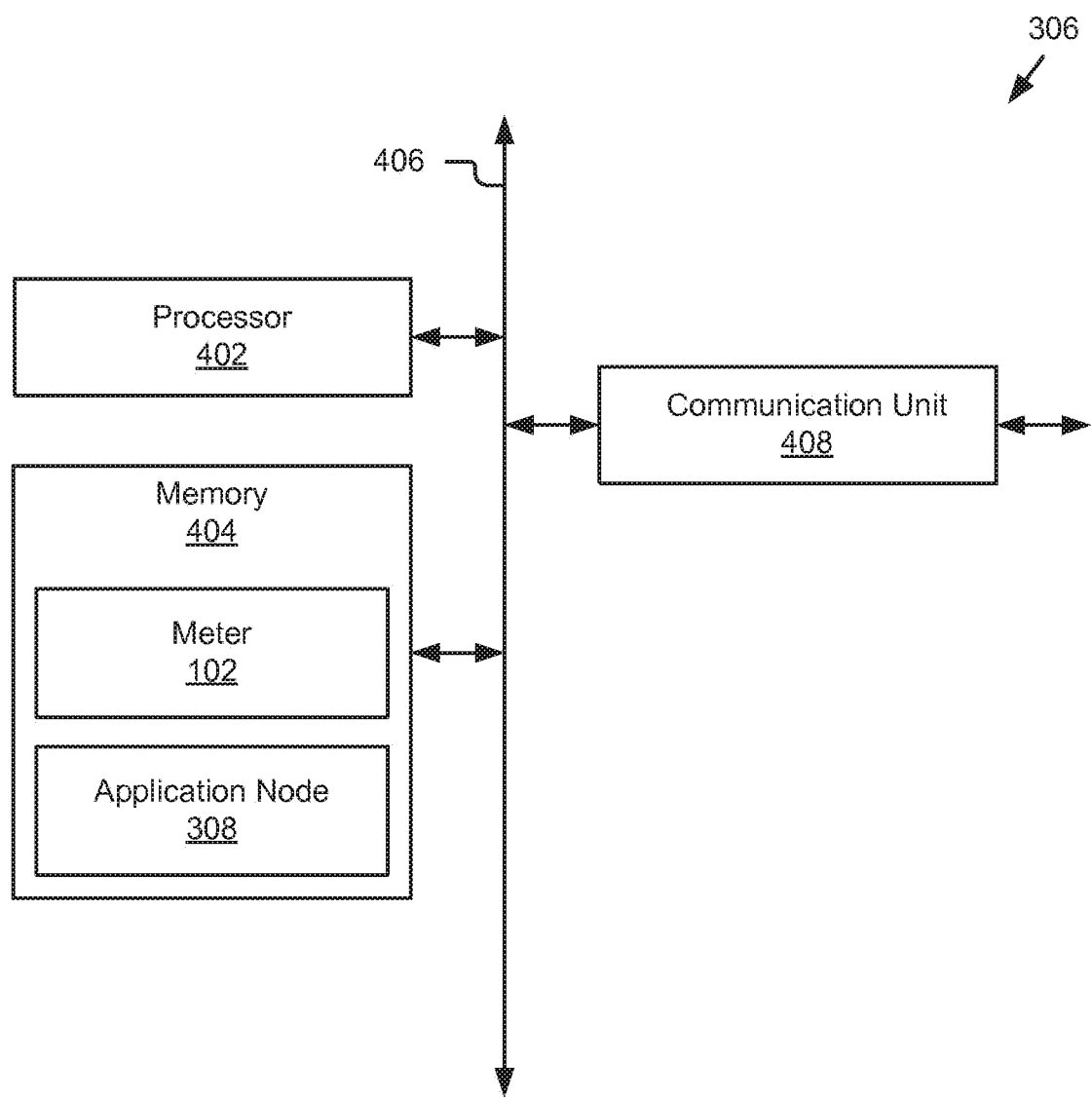
FIG. 4 is a block diagram of an example server instance having an example meter installed for monitoring the performance of an application node.

FIG. 4 is a block diagram of an example server instance 306 having an example meter 102 installed for monitoring the performance of an application node 308. As depicted, a server instance 306 may include a processor 402, a memory 404, and a communication unit 408, which may be communicatively coupled by a communication bus 406. The server instance 306 depicted in FIG. 4 is provided by way of example and it should be understood that it may take other forms and include additional or fewer components without departing from the scope of the present disclosure. For example, while not shown, the server instance 306 may include input and output devices (e.g., a computer display, a keyboard and mouse, etc.), various operating systems, sensors, additional processors, and other physical configurations.

The processor 402 may execute software instructions by performing various input/output, logical, and/or mathematical operations. The processor 402 have various computing architectures to process data signals including, for example, a complex instruction set computer (CISC) architecture, a reduced instruction set computer (RISC) architecture, and/or an architecture implementing a combination of instruction sets. The processor 402 may be physical and/or virtual, and may include a single core or plurality of processing units and/or cores. In some embodiments, the processor 402 may be capable of generating and providing electronic display signals to a display device (not shown), supporting the display of images, capturing and transmitting images, performing complex tasks including various types of feature extraction and sampling, etc. In some embodiments, the processor 402 may be coupled to the memory 404 via the bus 406 to access data and instructions therefrom and store data therein. The bus 406 may couple the processor 402 to the other components of the server instance 306 including, for example, the memory 404, and the communication unit 408.

The memory 404 may store and provide access to data to the other components of the server instance 306. In some embodiments, the memory 404 may store instructions and/or data that may be executed by the processor 402. For example, as depicted, the memory 404 may store the meter 102 and the application node 308. The memory 404 is also capable of storing other instructions and data, including, for example, an operating system, hardware drivers, other software applications, databases, etc. The memory 404 may be coupled to the bus 406 for communication with the processor 402 and the other components of server instance 306.

The memory 404 includes a non-transitory computer-usable (e.g., readable, writeable, etc.) medium that can contain, store, communicate, propagate or transport instructions, data, computer programs, software, code, routines, etc., for processing by or in connection with the processor 402. In some embodiments, the memory 404 may include one or more of volatile memory and non-volatile memory. For example, the memory 404 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™ etc.). It should be understood that the memory 404 may be a single device or may include multiple types of devices and configurations.

The bus 406 can include a communication bus for transferring data between components of a computing device or between computing devices, a network bus system including the network 104 or portions thereof, a processor mesh, a combination thereof, etc. In some embodiments, the meter 102, the application node 308, and various other computer programs operating on the cloud computing platform 302 (e.g., operating systems, device drivers, etc.) may cooperate and communicate via a software communication mechanism included in or implemented in association with the bus 406, which is capable of facilitating inter-process communication, procedure calls, object brokering, direct communication, secure communication, etc.

The communication unit 408 may include one or more interface devices (I/F) for wired and wireless connectivity with the other components (e.g., 106, 114, 302, 306, 310, 312, etc.) of the cloud computing platform 302 and the system 100. For instance, the communication unit 408 may include, but is not limited to, CAT-type interfaces; wireless transceivers for sending and receiving signals using Wi-Fi™; Bluetooth®, cellular communications, etc.; USB interfaces; various combinations thereof; etc. The communication unit 408 may couple to and communicate via the network 104 (e.g., networks 302, 312, etc.) and may be coupled to other components of the server instance 306 and/or the cloud computing platform 302 via the bus 406. In some embodiments, the communication unit 408 can link the processor 402 to a network, which may in turn be coupled to other processing systems. The communication unit 408 can send and receive data using various standard communication protocols, including, for example, those discussed elsewhere herein.

The application node 308 and the meter 102 may be adapted for cooperation and communication with the processor 402 and other components of the server instance 306 and/or cloud computing platform 302. The application node 308 and the meter 102 may include sets of instructions (e.g., software, code, etc.) executable by the processor 402 to provide their functionality. In some instances, the application node 308 and the meter 102 may be stored in the memory 404 of the server instance 306 and accessible and executable by the processor 402 to provide their functionality.

Figure 5:
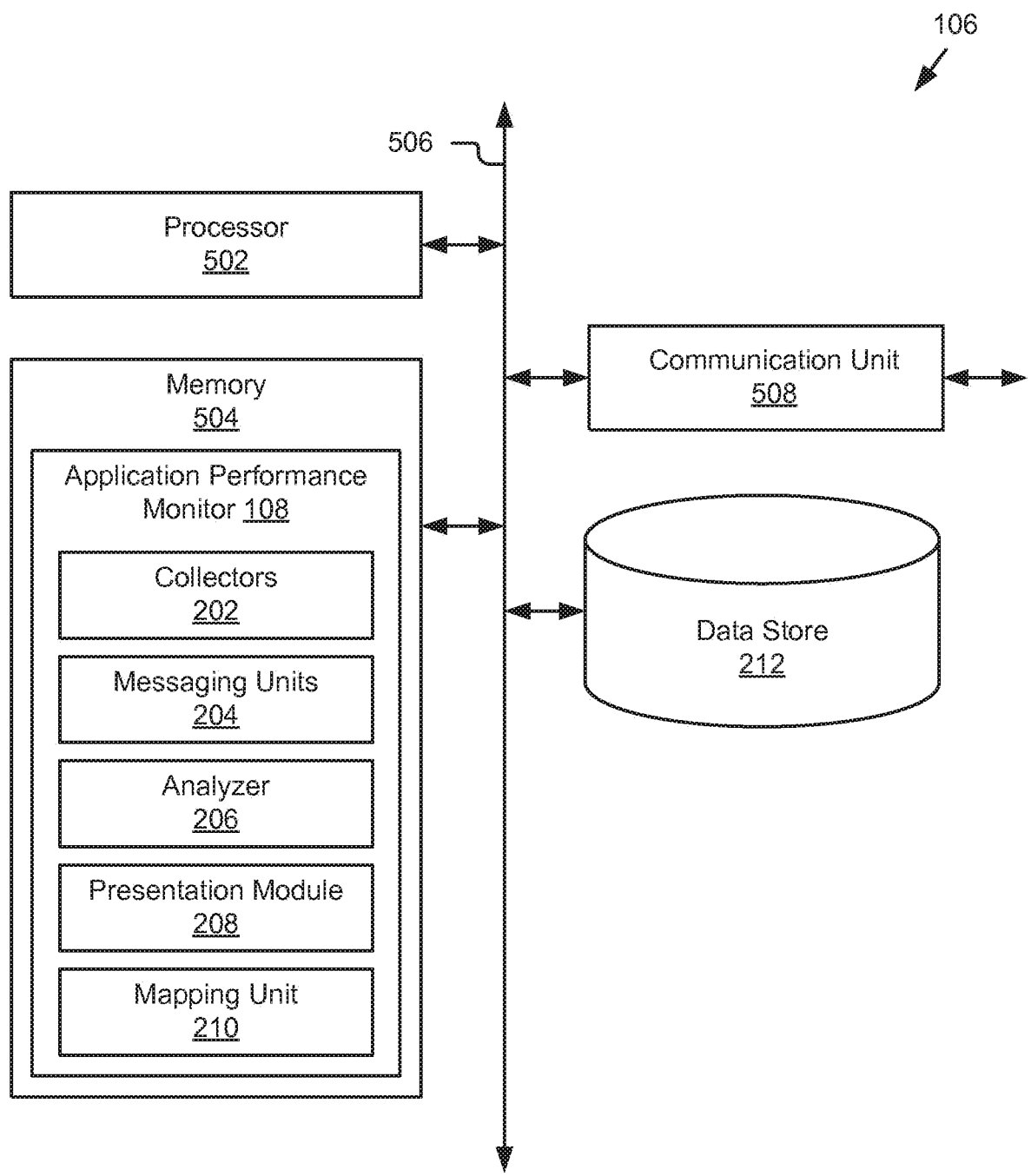
FIG. 5 is a block diagram of an example application performance server that includes an example performance monitor.

FIG. 5 is a block diagram of an example application performance server 106 that includes an example performance monitor 108. As depicted, the application performance monitor 108 may include a processor 502, a memory 504, and a communication unit 508, and the data store 212, which may be communicatively coupled by a communication bus 506. The application performance monitor 108 depicted in FIG. 5 is provided by way of example and it should be understood that it may take other forms and include additional or fewer components without departing from the scope of the present disclosure.

The processor 502 and communication unit 508 are the same or substantially similar in structure and functionality to the processor 402 and communication unit 408 discussed above with reference to FIG. 4 but adapted for use in the application performance server 106. The communication unit 508 may couple to the network 104 for communication with the other components of the system 100, including, for example, the meters 102 and the dashboards 110. The memory 504 may store and provide access to data to the other components of the application performance server 106. In some embodiments, the memory 504 may store instructions and/or data that may be executed by the processor 502. For example, as depicted, the memory 504 may store the application performance monitor 108. The memory 504 is also capable of storing other instructions and data, including, for example, an operating system, hardware drivers, other software applications, databases, etc. The memory 504 may be coupled to the bus 506 for communication with the processor 502 and the other components of the application performance server 106.

The memory 504 includes a non-transitory computer-usable (e.g., readable, writeable, etc.) medium that can contain, store, communicate, propagate, or transport instructions, data, computer programs, software, code, routines, etc., for processing by or in connection with the processor 502. In some embodiments, the memory 504 may include one or more of volatile memory and non-volatile memory. For example, the memory 504 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™ etc.). It should be understood that the memory 504 may be a single device or may include multiple types of devices and configurations.

The data store 212 is an information source for storing and providing access to data. In some embodiments, the data store 212 may be coupled to the components 502, 504, and 508 of the server 106 via the bus 506 to receive and provide access to data. In some embodiments, the data store 212 may store data received from the application performance monitor 108, the meters 102, the user devices 114, and/or dashboards 110 of the system 100, and provide data access to these entities. Non-limiting examples of the types of data stored by the data store 212 may include, but are not limited to, application operational data including network data, packet header data, server instance data, performance analysis data, user data, etc. The data store 212 may be included in the server 106 or in another computing device and/or storage system distinct from but coupled to or accessible by the server 106. The data store 212 can include one or more non-transitory computer-readable mediums for storing the data. In some embodiments, the data store 212 may be incorporated with the memory 504 or may be distinct therefrom. In some embodiments, the data store 212 may include a database management system (DBMS) operable on the server 122. For example, the DBMS could include a structured query language (SQL) DBMS, a NoSQL DMBS, various combinations thereof, etc. In some instances, the DBMS may store data in multi-dimensional tables comprised of rows and columns, and manipulate, i.e., insert, query, update and/or delete, rows of data using programmatic operations.

In some embodiments, the application performance monitor 108 may include an application programming interface (API) for accessing the historical operational metrics stored in the data store 212, such network traffic metadata, the network traffic data, and state dumps. The metadata may provide a listing of the time series available for a given organization. The following commands may be used to receive a response:

```
> GET https://api.boundary.com/{org_id}/{series}/metadata
< 200 OK
{
    "volume_Is_meter_port_protocol":
        {
    "href":
    "https://api.boundary.com/{org_id}/{series}/metadata",
    "metadata": {
        "keys": [
            "epochMillis",
            "observationDomainId
            ", "portProtocol"
        ],
        "majorAlignment": {
            "blocksize": 10000
        },
        "minorAlignment": {
            "blocksize": 1000
        },
        "partitionAlignment": {
            "blocksize": 100
        },
        "partitionProperty": "observationDomainId",
        "properties": [
            "epochMillis",
            "observationDomainId
            ", "portProtocol",
            "ingressPackets",
            "ingressOctets",
            "egressPackets",
            "egressOctets"
        ]
    }
    },
}
```

The response body includes a mapping of the time series name to information about the time series data. The href property points to the URI for each metadata entry. The keys property lists the fields which, when combined, form uniqueness for each measurement. The properties entry gives the dimensions and measurements available in the data.

For the network traffic data, the following commands may be used to receive a response:

```
> GET https://api.boundary.com/{org_id}/{series}/
history?from={timestamp}&to={timestamp}&aggregations=
{dimension_list}&observationDomainIds={obs_domain_id_list}
< 200 OK
{
    "header": {
        "count": 153,
        "latency": 88
    },
    "schema": {
        "dimensions": [
            "epochMillis",
            "observationDomainId"
        ],
        "measures": [
            "ingressPackets",
            "ingressOctets",
            "egressPackets",
            "egressOctets"
        ]
    },
    "data": [
        1339018569000,
        4,
        "",
        24,
        1352,
```

```
        24,
        4153
    ], [
        1339018569000,
        2,
        "",
        3,
        164,
        3,
        378
    ], [
        1339018569000,
        3,
        "",
        2,
        104,
        2,
        338
        ],
    ],
}
```

In the GET command, org_id=organization id; series=the name of the time series as returned in the key from the metadata listing resource above; from and to =the timestamps specifying the range of data to query; and observationDomainids=a comma separated list of meter ids that should be included.

In the response body, the header section gives information about the latency and number of observations returned. The schema section repeats the metadata for the time series being queried. The data lists the observations in temporal order as an array of arrays. Values in each array are in the same order as they appear in the schema section with dimensions first and measures next.

For the state dumps, the following commands may be used to receive a response:

```
> GET https://api.boundary.com/{stream_id}/{series}/state
< 200 OK
```

In the GET command, n specifies the number of data points to fetch. Data for all meters 102 is included. The state dumper is configured to return whole mutable windows. This is so that clients that load previous state from the data store 212 and continue writing to a given mutable window do not cause data loss on the following write.

The response body is the same as the one received for network traffic data.

For per Meter Queries, observationDomainIds=1,2,3 may be used to specify the meters 102 to include. In addition, the following parameters may be set:
 volume_1(h1m1 s)_meter;
 volume_1(h1m1s)_meter_ip;
 volume_I(himis) meter_port_protocol; volume_I(himis)
  _meter_country; and
 volume_1(h1m1 s)_meter_asn.

For conversation queries, conversationids=8KteAS41, 8L1CAd6B may be used to specify the conversations to include (which replaces the observationDomainids parameter for meter-oriented queries). In addition, the following parameters may be set:
 volume_I(h1m1s)_conversation_total;
 volume_I(h1m1s)_conversation_ip;
 volume_I(h1m1s)_conversation_port_protocol;
 volume_I(h1m1s)_conversation_country; and
 volume_I(h1m1s)_conversation_asn.

As depicted in FIGS. 2 and 5, the application performance monitor 108 may include collectors 202, messaging units 204, an analyzer 206, a presentation module 208, and a mapping unit 210. The application performance monitor 108 and its components 202,204,206, 208, and 210 may be adapted for cooperation and communication with the processor 502 and other components of the application performance server 106 and the system 100. The application performance monitor 108 and its components 202,204,206, 208, and 210 may include sets of instructions (e.g., software, code, etc.) executable by the processor 502 to provide their functionality. In some instances, the application performance monitor 108 and its components 202,204,206,208, and 210 may be stored in the memory 504 of the server 106 and accessible and executable by the processor 502 to provide their functionality. It should be understood that the application server 106 may, in some embodiments, represent a distributed computing system, such as a cloud-based environment, and that the components 202, 204, 206, 208, and 210 of the application performance monitor 108 may be hosted on any combination of distributed computing devices and the mapping unit 210 may coordinate the operations of and interaction between the various components of the application performance monitor 108.

Figure 6:
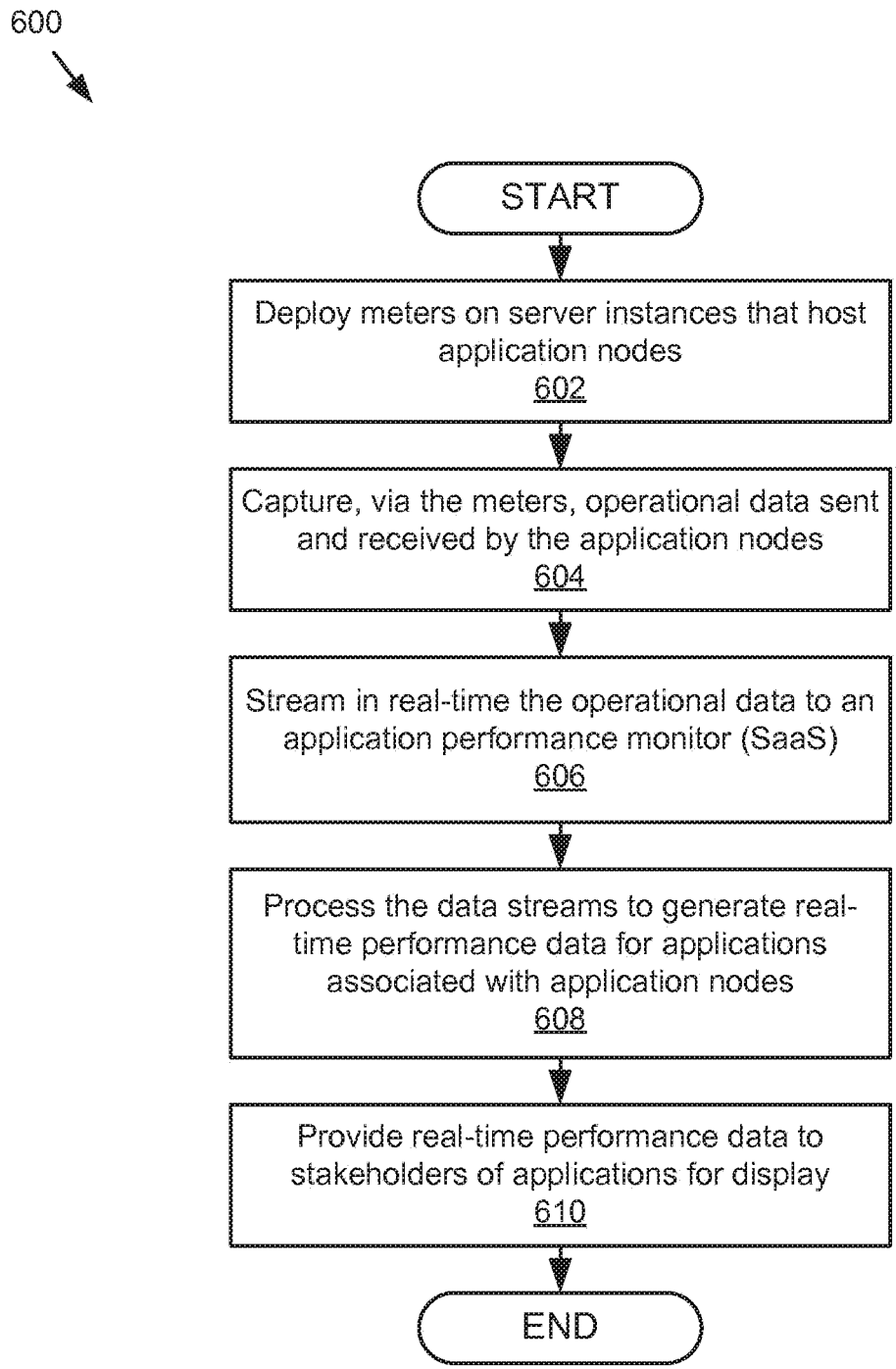
FIG. 6 is a flowchart of an example method for monitoring application performance in real-time.

FIG. 6 is a flowchart of an example method 600 for monitoring application performance in real-time. The method 600 may include deploying 602 meters 102 on server instances 306 that host application nodes so the meters 102 can monitor the network traffic being sent and received by the application nodes. The server instances 306 that host the application nodes may be on the same cloud computing platform 302 or a plurality of different cloud computing platforms 302. Once deployed, the each meter 102 may capture 604 operational data including the network traffic being send and received by the application nodes 308 and the host data for the host on which the application node 308 operates resides (e.g., storage space, processing load, memory usage, error logs, etc.). The meters 102 can securely stream 606 in real-time the operational data (also referred to as application flow data) including network traffic and host data to the application performance monitor 108.

The application performance monitor 108 can process 608 the data streams to generate real-time performance data for the applications associated with the application nodes 308. An application may include a single application 308 node or a plurality of application nodes 308 distributed across the network 104. The performance data includes continual insights into how the application is performing, whether an application is operating within parameters, how the application is performing compared to other applications of the same type, how the server instances, intervening infrastructure, and/or cloud computing platforms are performing, etc. The application performance monitor 108 can provide 610 the real-time performance data to stakeholders of the application for display via the dashboards 110. The performance data may be continually provided/streamed to the dashboards 110 so the stakeholders can closely monitor the performance of the applications. The performance data may be visualized, for example, using graphs, so that any sudden variations in performance may be easily identifiable as abnormalities to the users.

This performance data is unique because it provides deep insights into how the underlying infrastructure of cloud computing platforms can affect application performance. In particular, it can provide users with advanced analytics and innovative application flow measurements for cloud computing environments instantaneously. For instance, the performance data may include reliability and low latency metrics, which can monitored to ensure that the proper levels are maintained, particularly for business critical applications operating in these cloud computing environments. Further, since these cloud computing environments often experience changes to their infrastructure (e.g., networks), elevated latency levels and other performance issues are often introduced. The performance data provides users with a way to identify and address these performance issues before they become widespread. Example interfaces showing the real-time performance data are shown in FIGS. 12B-G, which are discussed in further detail below.

Figure 7:
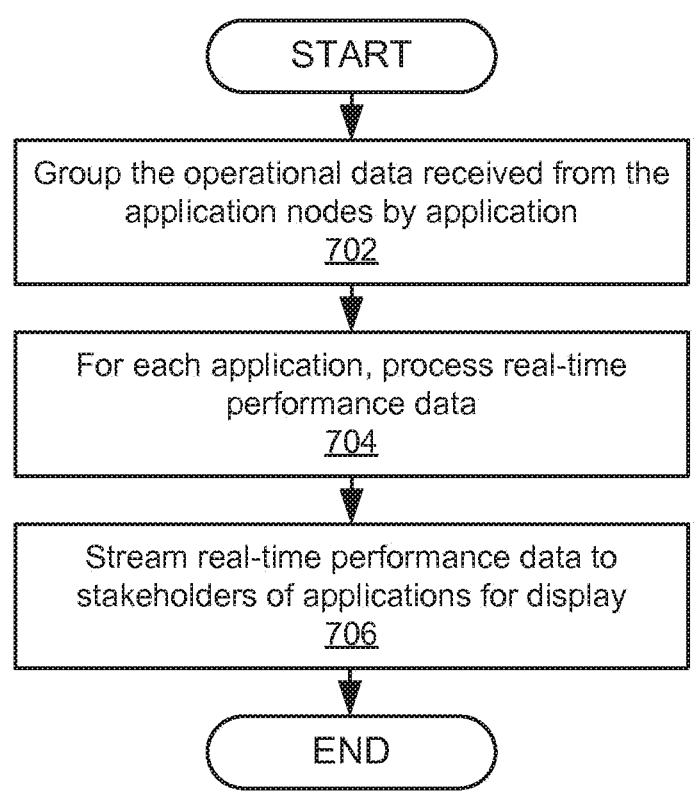
FIG. 7 is a flowchart of an example method for processing real-time application performance data.

FIG. 7 is a flowchart of an example method 700 for processing real-time application performance data. The method 700 may be combined with other methods discussed herein. For example, the method 700 may be an expansion of at least the block 608 and 610 of the method 600. The method 700 may include grouping 702 the operational data received from one or more application nodes 308. For example, the messaging units 204 may group and organize the data streams being received from the meters 102 using one or more application grouping criteria, such as application, customer/organization, a custom user-defined grouping, etc. The analyzer 206 may then process 704 real-time performance data for each application by analyzing the grouped and/or organized data streams and generating performance insights based thereon. The performance insights may include statistics for the data flows between application components, indicate the overall health of the application, identify any hardware components or software components that are experiencing performance issues, include an application topology, annotations for the operational data, a visual change log indicating changes in application flow and/or topology, include comparative statistics showing the performance of similar applications, cloud computing platforms, infrastructure, etc. The presentation module 208 may stream 706 the performance data to the stakeholders of the applications for display.

To further illustrate the operations of the methods 600 and 700, the following non-limiting example is provided. A customer may define an application to include three application nodes 308a, 308b, and 308c, and may deploy meters 102a, 102b, and 102c to monitor these application nodes 308a, 308b, and 308c. The application nodes 308a, 308b, and 308c and the meters 102a, 102b, and 102c may be installed on server instances 306 that are located in the same cloud computing platform 302 or different cloud computing platforms 302. The application nodes 308a, 308b, and 308c may exchange data between one another and other entities of the system 100 (e.g., client computers, data stores, etc.) in carrying out the services provided by the application. The meters 102a, 102b, and 102c may capture the data being exchanged (e.g. once per second) and stream it to the collectors 202. The mapping unit 210 may assign one or more collectors 202 to collect the data streams and provide them to a designated messaging unit 204. The messaging unit 204 may group the data streams being received from the meters 102a, 102b, and 102c as corresponding to the application defined by the customer and then provide these data streams to the analyzer 206 for processing/analyzing. The analyzer 206 may analyze the data streams, combine them into a performance data stream, and then provide the performance data stream to the presentation module 208 (e.g., via the messaging unit 204), which may process the data for display via dashboard 110 and then provide it to customer's client device 114.

Figure 8A:
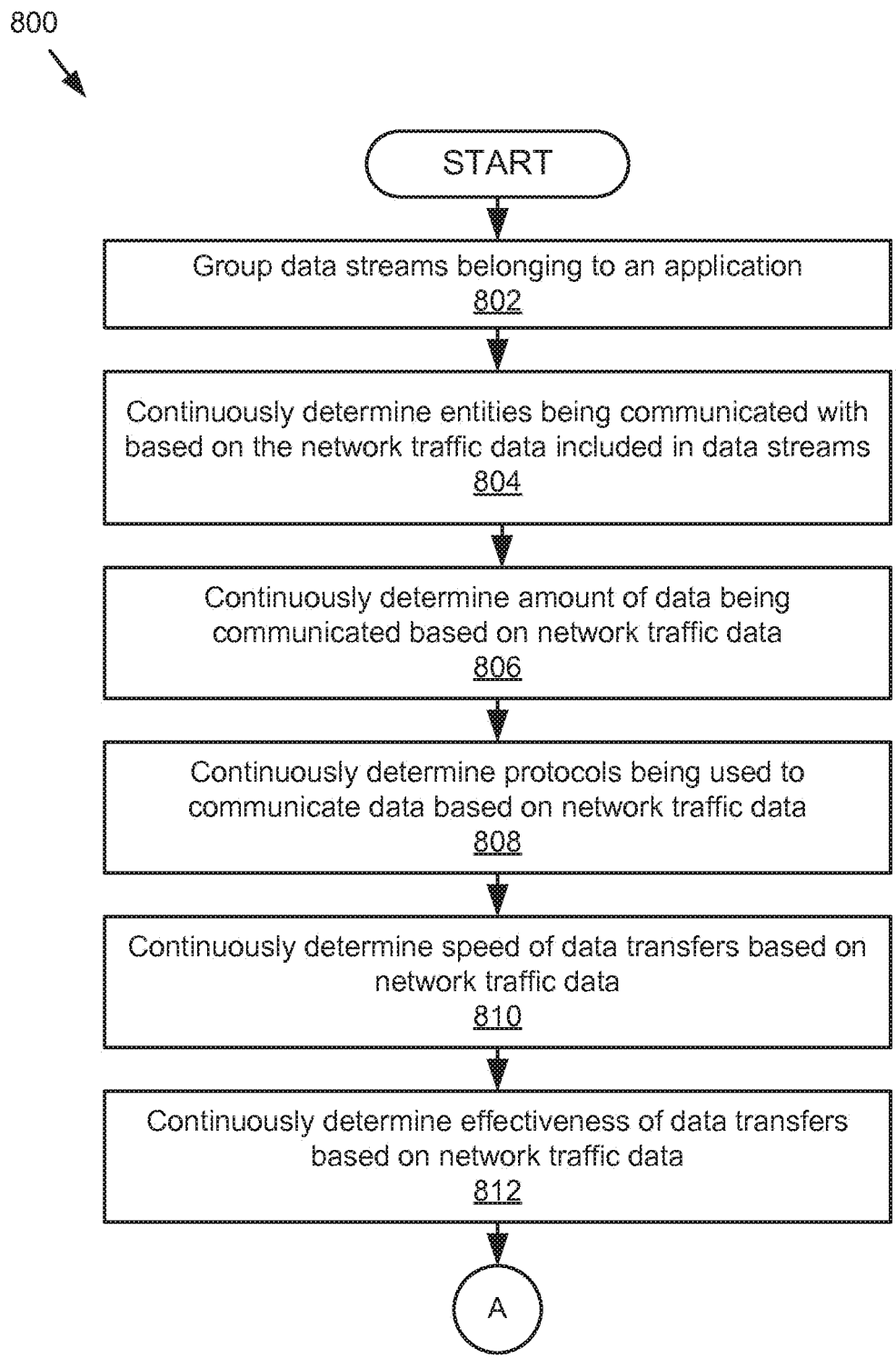
FIGS. 8A and 8B are flowcharts of a further example method for processing real-time application performance data.
Figure 8B:
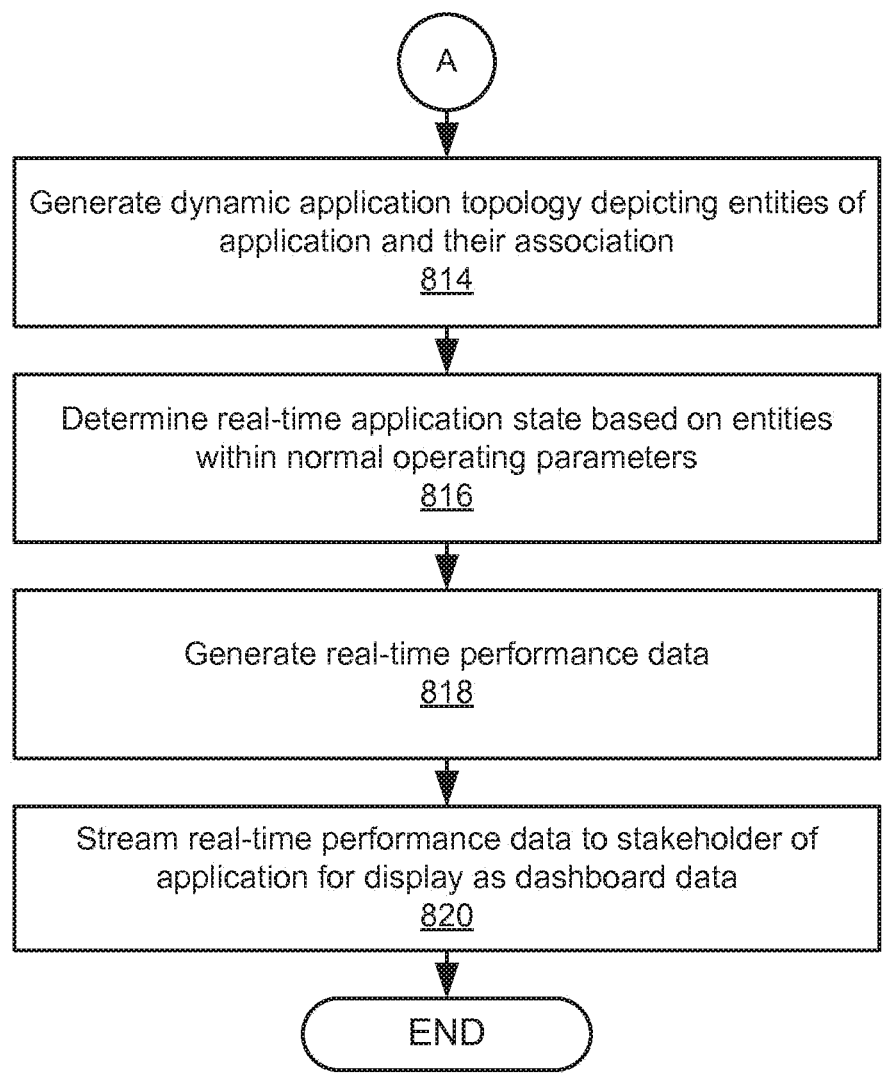

FIGS. 8A and 8B are flowcharts of a further example method 800 for processing real-time application performance data. The method 800 may include grouping 802 data streams belonging to application using via a message unit 204, as discussed elsewhere herein. Next, the analyzer 206, using the data streams, may continuously determine 804 the entities being communicated with based on the network traffic data included in the data streams; continuously determine 806 the amount of data being communicated based on the network traffic data; continuously determine 808 the protocols being used to communicate data based on the network traffic data; continuously determine 810 the speed of data transfers based on the network traffic data; continuously determine 812 the effectiveness (e.g., latency, retransmissions, etc.) of the data transfers based on the network traffic data; generate 814 a dynamic application topology depicting the entities of the application and their association; and determine 816 a continual real-time application state based on whether the entities of the application are operating within normal operating parameters. In addition, the analyzer 206 may analyze host data for the hosts from which the data streams are being received to determine the operational health of the hosts and any issues therewith and include that analysis in the performance data.

In some embodiments, the dynamic application topology generated in block 814 may automatically identify and include or remove computing devices (e.g., server, appliance, storage, networking, infrastructure devices, etc.) that may be added or removed from the cloud computing platforms 302 being utilized by the application without requiring any additional input from the user or the cloud computing platforms 302, and thus may dynamically change with the computing resources being used by the application. These devices may be identified at least in part by analyzing the header data from the network packets being sent and received by the application. By way of further example, the analyzer 206 may automatically discover and map the application topology at high frequency intervals (e.g., every tenth of a second, half second, second, etc.) and updates the topology every cycle to identify to users in real-time whether something changed in their application or in the underlying cloud computing platform infrastructure. The dynamic topology map may provide a visualization of how much traffic is passing between application tiers or nodes, and depict what specific services are running, their throughput, and how much latency is introduced. Using this dynamic application topology, users may identify unknown or unexpected application behaviors and take actions to correct them, and can eliminate reliance on "tribal knowledge" when troubleshooting issues and reduce the mean time to repair problems from hours to seconds.

In some instances, a dynamic group of server instances 306 may be created and tracked in real time. The dynamic group may be updated by the analyzer 206 automatically based on the data streams/application flows being received, thus eliminating manual reconfiguration every time a new server instance 306 is added or removed. The dynamic group may track membership, and as soon as a server instance 306 is added, the analyzer 206 may identify its presence and add it to the dynamic group. The dynamic group definitions may be stored and accessed from the data store 212.

In addition, the analyzer 206 may analyze the network packet headers being sent and received by the application to perform the processing/analysis in blocks 804, 806, 808, 810, 812, 814, and/or 816. The analyzer 206 may generate 818 real-time performance data that based on the processing performed in blocks 804, 806, 808, 810, 812, 814, and/or 816 and then the presentation module 208 may the process the real-time performance data for visualization and presentation, and then stream 820 it to a stakeholder of the application for display as dashboard data via the dashboard 110. Because the collectors 202 may collect network data from the meters 102 at high frequencies (e.g., per second), which includes cloud network latency, packet retransmissions, and out of order packet statistics, the analyzer 206 may instantaneously generate performance data that can be visualized by the presentation module 208 to show deep application detail including throughput, latency (illustrated by time series graphs showing ultra-low latency), and network statistics by traffic type, node, country, or network. Users may utilize this visualized performance data to assess the impact of changes as they happen and proactively identify emerging application performance problems.

Figure 9:
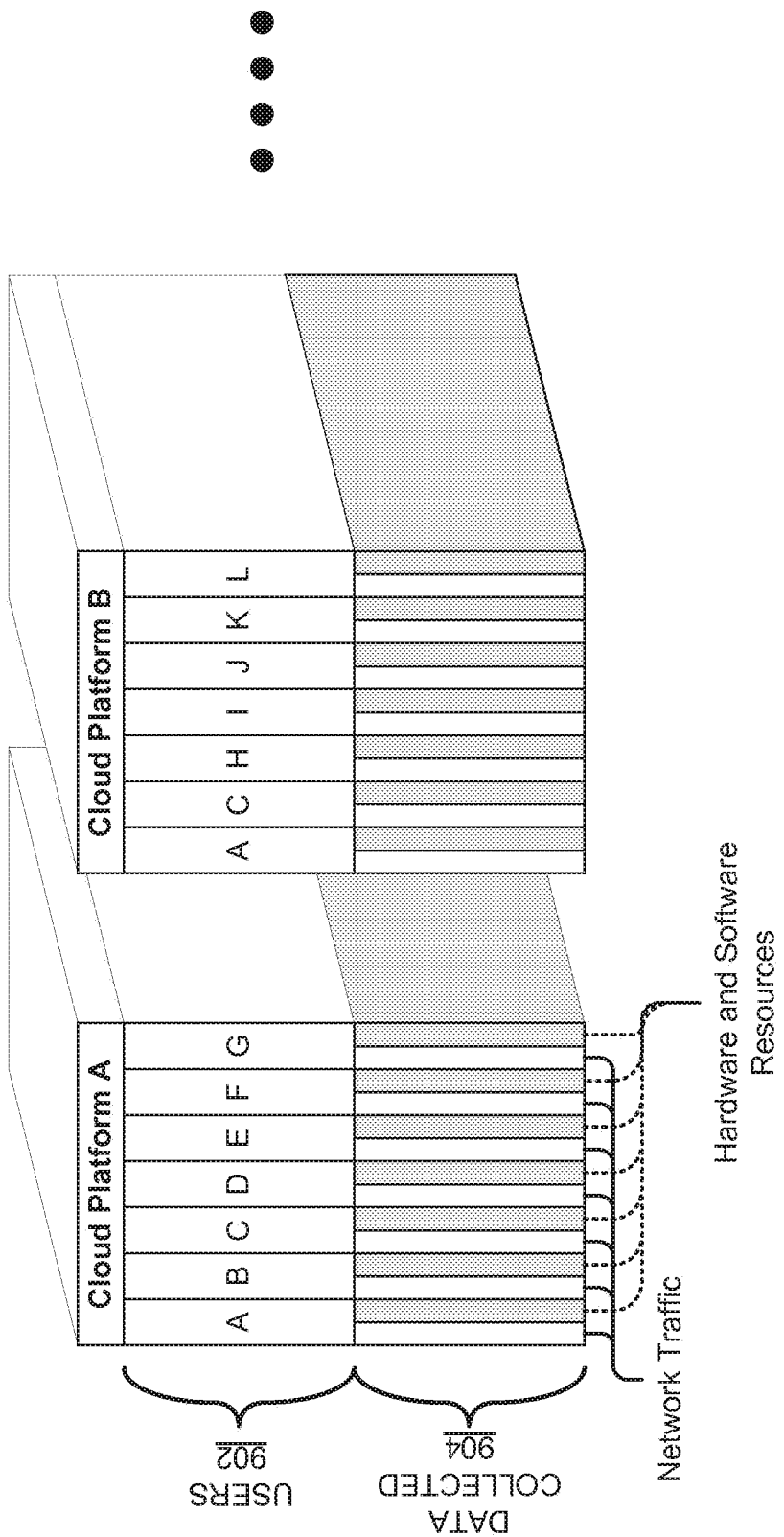
FIG. 9 is a block diagram of example application operational data that is collected and processed across various example cloud computing platforms.

FIG. 9 is a block diagram of example application operational data that is collected and processed across various example cloud computing platforms. The system 100 depicted in FIG. 1 may include a large number of users. For example, hundreds, thousands, millions, etc., of users/customers may use different cloud computing platforms, such as platform 302 depicted in FIG. 3. Many users who use the same or different cloud computing platforms may use the same applications, application types, resources etc. In addition, some users may distribute their applications across multiple clouds computing platforms (e.g., for efficiency, load balancing, redundancy, data integrity reasons, etc.). The application performance monitor 108 may collect operation data for each user's applications regardless of whether the application is hosted on one cloud platform or across more than one cloud platform.

By way of further example, as depicted in FIG. 9, a plurality of users 902 may use cloud platforms A and B to host various applications or aspects thereof. In particular, users A-G may use cloud platform A to host various application nodes and users A, C, H-L may use cloud platform B to host various application nodes. The operational data 904 collected for each user A-L may include network traffic and hardware/software resources for that user's application nodes. In addition, even though users A and C may have applications that include application nodes installed on both cloud platforms A and B, the data streams received from the meters 102 monitoring those application nodes may be grouped and processed together by the application performance monitor 108, provided they are associated, to provide a comprehensive analysis of the performance of the applications as well as the performance of both cloud platforms A and B.

Figure 10:
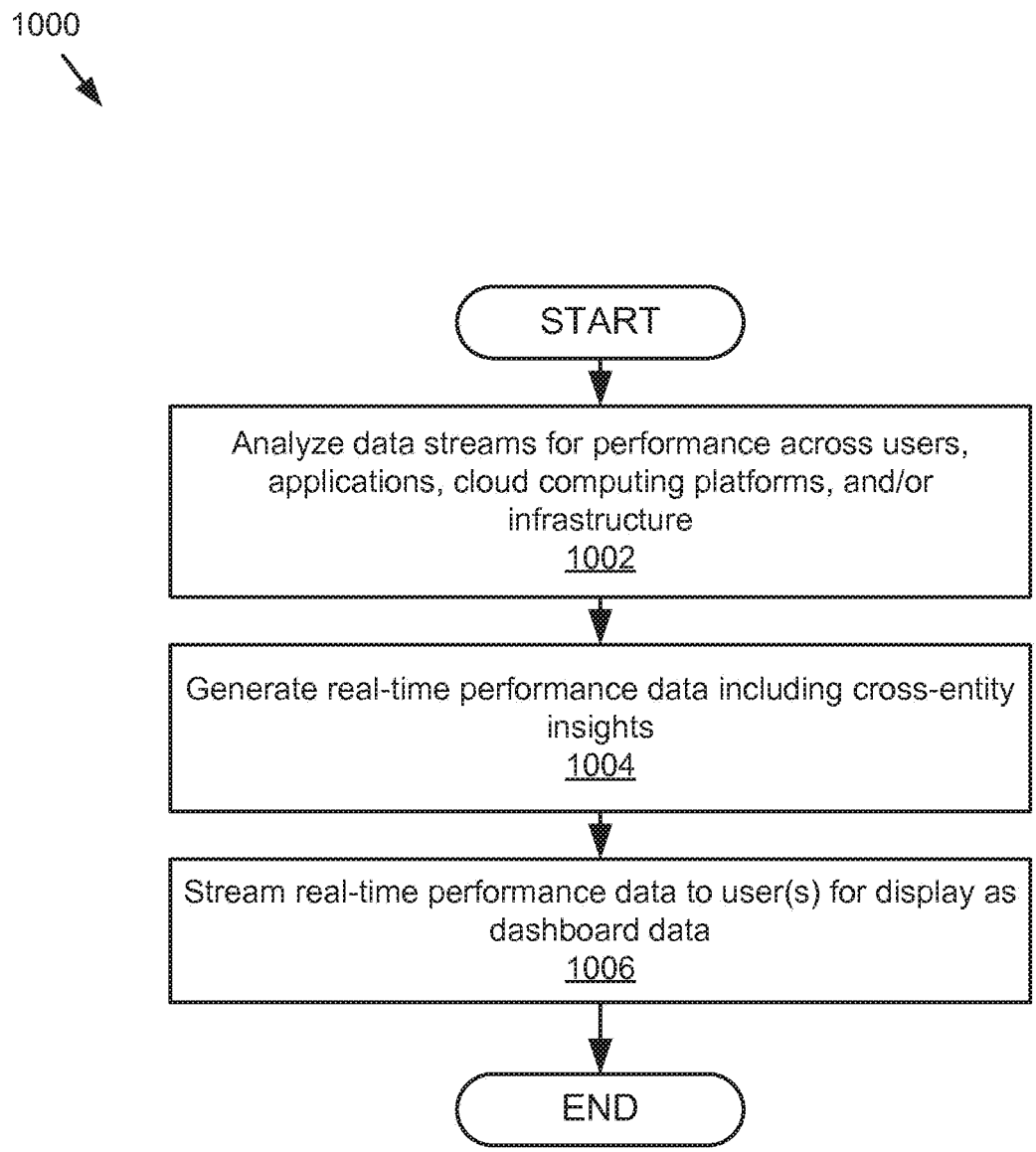
FIG. 10 is a flowchart of an example method for processing real-time cross-entity operational data.

FIG. 10 is a flowchart of an example method 1000 for processing real-time cross-entity performance data. The method 1000 may be combined with other methods discussed herein. For example, the method 1000 may be an expansion of the analysis performed in methods 600, 700, or 800. The method 1000 may include analyzing, via the analyzer 206, data streams across entities to generate cross-entity performance statistics. In some embodiments, the analyzer 206 may analyze 1002 performance across users, applications, cloud computing platforms, and/or infrastructure, etc., and the generate 1004 real-time performance data that includes cross-entity insights based on the analysis, which can be streamed 1006 by the presentation module 208 to the user(s) for display as dashboard data as discussed elsewhere herein.

By way of example, the analyzer 206 may analyze 1) one customer across two or more cloud platforms, 2) two or more customers across a single cloud, and 3) two or more customers across two or more clouds, etc., to provide comparative insights. The comparative insights may compare one or more aspects of the cloud computing platforms including, but not limited to, data storage, platform stacks, APIs, operating systems, application performance, IP services (e.g., dynamic, static), computer architecture, application infrastructure, networks, geographical regions, etc. By way of further example, for a given customer, the analyzer 206 may analyze the data received from meters 102 installed on two or more different cloud platforms to determine which cloud platforms have performed better overall as well as which clouds have performed better across different aspects thereof. For two or more customers across two or more clouds, the analyzer 206 may identify which cloud computing platform provide the best overall performance as well as produce a comparative breakdown for each aspect (e.g., infrastructure, platform, software aspects/services, etc.) of the cloud platforms to show which platform performs best for each aspect. For two or more customers across a single cloud platform, the analyzer 206 may compare a given user's application operational performance to the other users of the cloud platform to determine how it is performing in comparison, whether any hardware, software, or network issues being experience are isolated to the user, common across all users, or common across users having certain attributes in common (all on the same version of an application, all using the same database server cluster, all on the same network switch or router, etc.).

Since these comparative performance statistics are produced using real-time data streamed from meters 102 operating on the cloud platforms, users can use these statistics to reallocate resources between cloud platforms, regions, server instances, databases, etc., to reduce downtime, optimize performance, and ensure the best possible user experience for their own end users.

Figure 11:
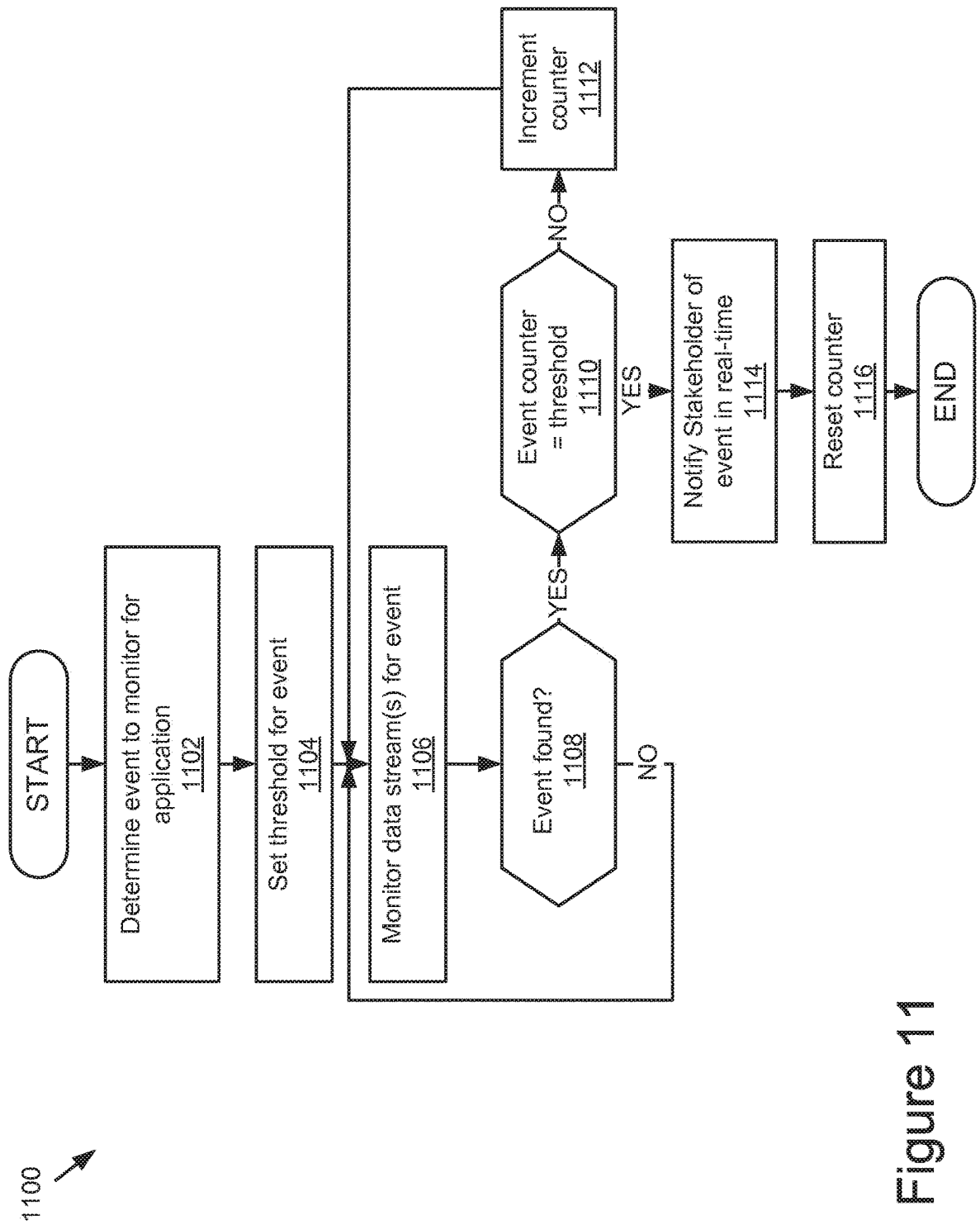
FIG. 11 is a flowchart of an example method for monitoring real-time event data streams for events and notifying stakeholders of such events.

FIG. 11 is a flowchart of an example method 1100 for monitoring real-time event data streams for events and notifying stakeholders of such events. The method 1100 may be performed in conjunction with the other methods discussed herein, such as the data stream analysis operations discussed above with reference to methods 600, 700, 800, and 1000. The method 1100 includes determining 1102 an event to monitor for the application. The event may be a user-defined event input by a stakeholder of the application or may be an event predetermined by the application performance monitor 108. Next, the method 1100 sets a threshold for the event. In some embodiments, the presentation module 208 may set 1104 a threshold for the event. For example, the stakeholder may input the criteria for the event including the threshold using the dashboard 110 and the dashboard 110 may transmit the event criteria to the presentation module 208 for storage in association with the application (e.g., in the data store 212). In other embodiments, the threshold may be predefined along with a set of events and thresholds in the data store 212.

In some embodiments, the analyzer 206 may intelligently set event thresholds and alerts. For example, the analyzer 206 may automatically establish normal application behavior based on historical application trends and then, using advanced analytics, warn users at the earliest sign of potential problems when application behavior deviates from those trends.

The presentation module 208 may store the event criteria in the data store 212 and the analyzer 206 may use the event criteria to determine whether a threshold for the event has been met. In particular, the analyzer 206 may monitor 1106 the data streams associated with the application for instances of the event during the processing of those data streams for performance data. If an instance of the event is found in block 1108, the analyzer 206 may determine 1110 whether the threshold for the event has been met (e.g., by comparing an event counter to the threshold). If it hasn't, the analyzer 206 may increment 1112 the event counter and return to monitoring the data streams it processes for additional instances of the event. If it has, the analyzer 206 may instruct the presentation module 208 (e.g., directly, via the messaging unit 204 with which the analyzer 206 is cooperating, etc.) to notify 1114 the stakeholder of the event in real-time, and the presentation module 208 may generate and transmit notification to the stakeholder and/or may perform a corrective action. The analyzer 206 may then reset the counter 1116 for that event and the method 1100 may begin again. The real-time, analytics driven alerts provided by the method 1100, which may be based on any metric or combination thereof, are advantageous as they enables users to catch problems while they are manageable (e.g., before they become full blown outages).

By way of further example, the event may be triggered by changes in various aspects of the application environment being relied upon and the analyzer 206 can trigger alerts based on those changes. This is advantageous because a stakeholder may immediately be informed about the changes in the application environment that have occurred and may clearly visualize the impact on application performance. In some embodiments, the analyzer 206 can track the impact of configuration and code changes in the environment and trigger notification thereof. Using the dashboards 110, users can view historical trends for application latency and throughput and may set custom alerts based thereon. In some embodiments, events and/or alerts may be received via other notification mechanisms including electronic message, RSS feeds, or an API.

FIGS. 12A-12G are graphical representations of example user interfaces generated by the system 100 for application performance monitoring. FIG. 12A shows a user interface 1200 for auto-discovery of applications. The user interface 1200 may include a map 1202 showing the components associated with the application and a prompt 1204 indicating that traffic has been detected from previously unknown ports and that the application performance monitor 108 can associate that traffic with an application (e.g., by creating an application, associated the traffic with an existing application etc.). As discussed elsewhere herein, the application performance monitor 108 may automatically discovers relationships and continuously stream real-time updates (e.g., once per second) about new relationships that were discovered so that the most up-to-date view of the application may continuously be provided to the user via the dashboard 110.

Figure 12B:
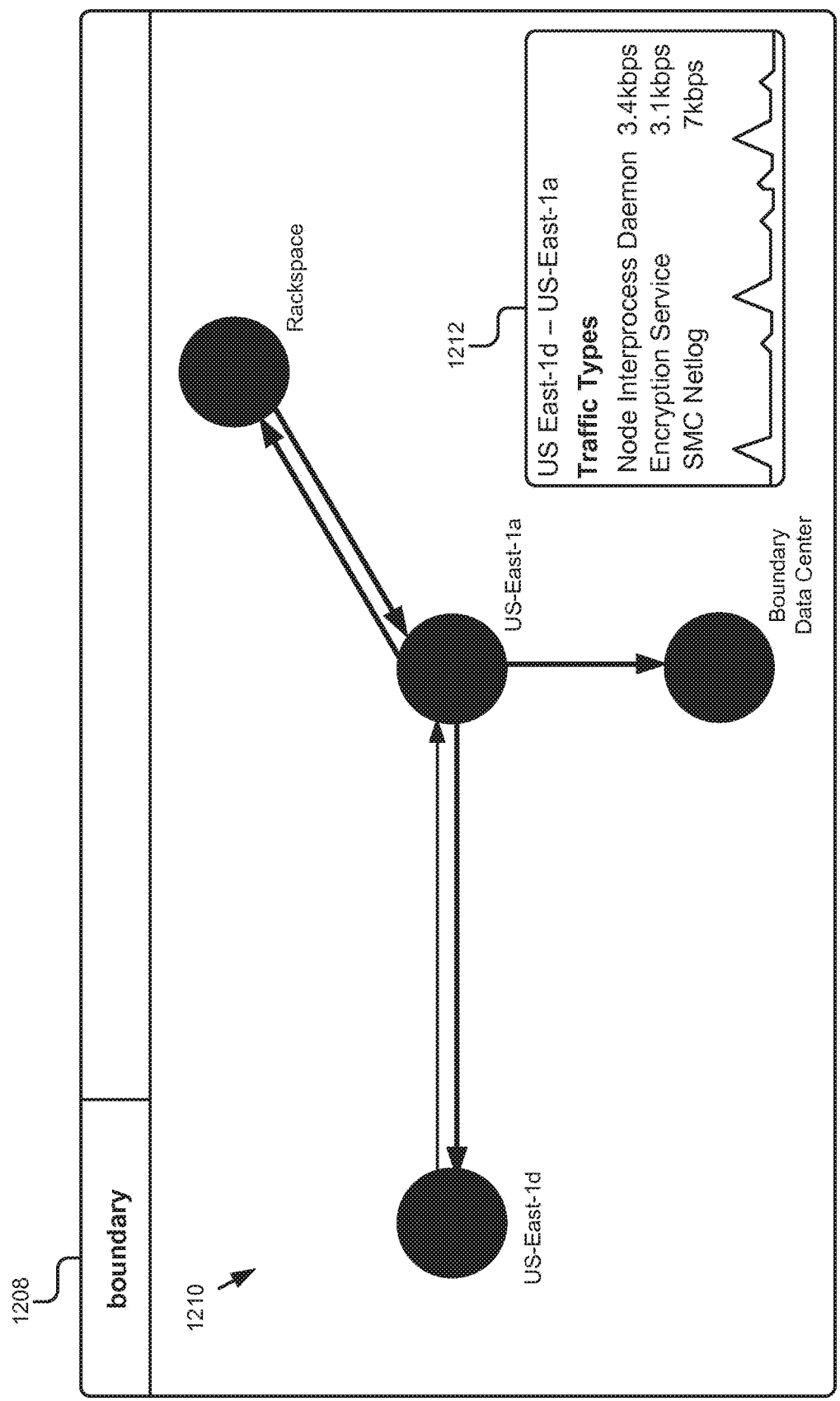

FIG. 12B shows a user interface 1208 for visualizing application dependencies. The user interface 1208 may include a dependency map 1210 illustrating the computing resources that are exchanging data with an application, the data being sent by the application node (e.g., US-East-la), as well as the level and type of traffic being exchanged between each node. For instance, heavier arrows may indicate higher traffic levels and lighter arrows may indicate comparatively lower traffic levels. In addition, selecting a node on the map may change the display 1212, which provides details about the traffic being exchanged along with a graph showing changes in the traffic levels over time.

Figure 12C:
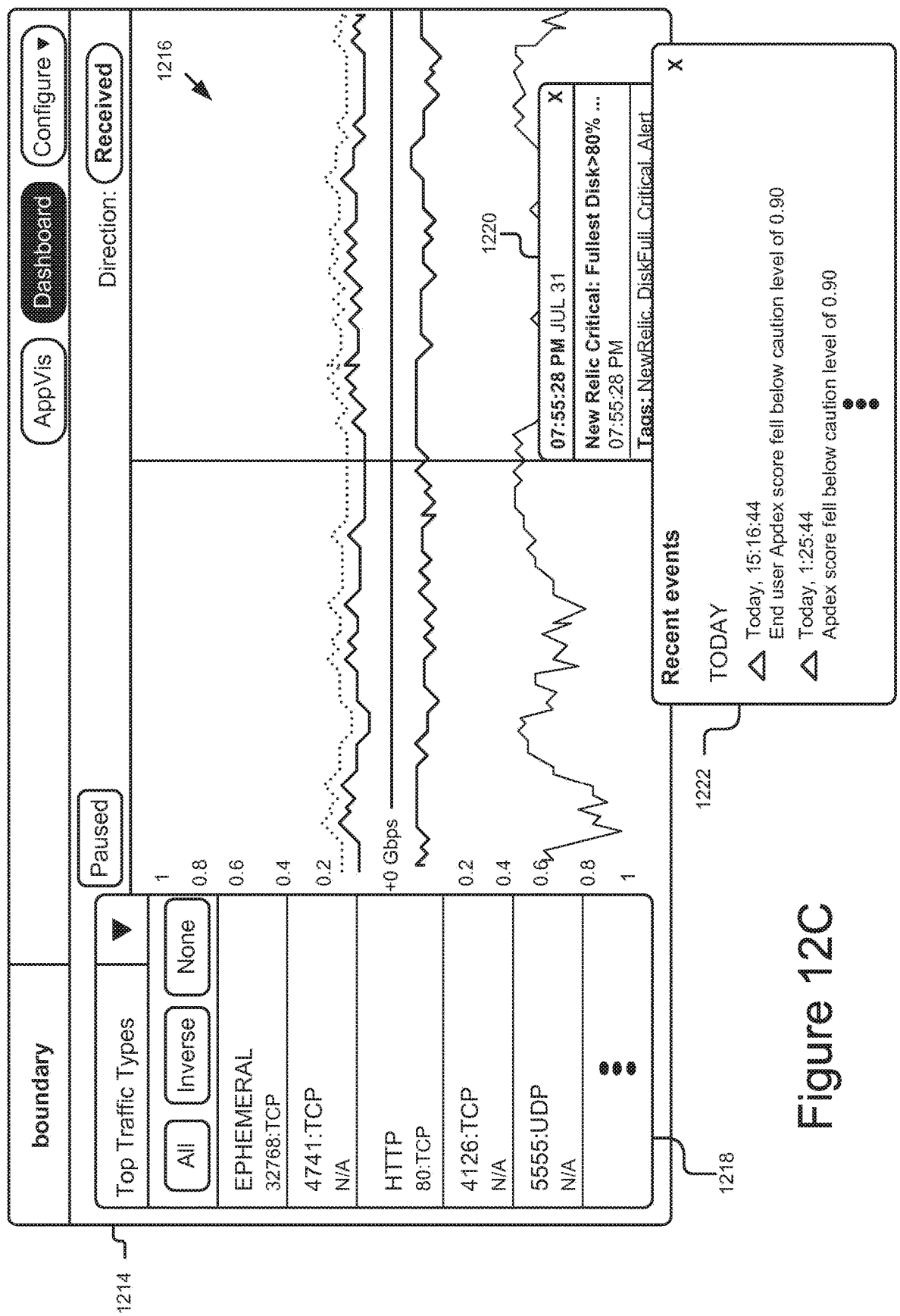

FIG. 12C shows a user interface 1214 for visualizing application performance. The user interface 1214 may include a region 1218 for displaying top types of traffic being exchanged, a visual change log region 1216 that provides a graphical display of the level of traffic being sent and received, which is continuously monitored by the meters 102 and updated by the application performance monitor 108. The user interface also includes annotations 1220 and 1222 providing alerts of events (e.g., changes in infrastructure, metrics, etc.) that have recently occurred. Via the user interface 1214, users can visualize application topologies and view network latency metrics, such as latency measurements to external services (e.g., micro-blogging services).

Figure 12D:
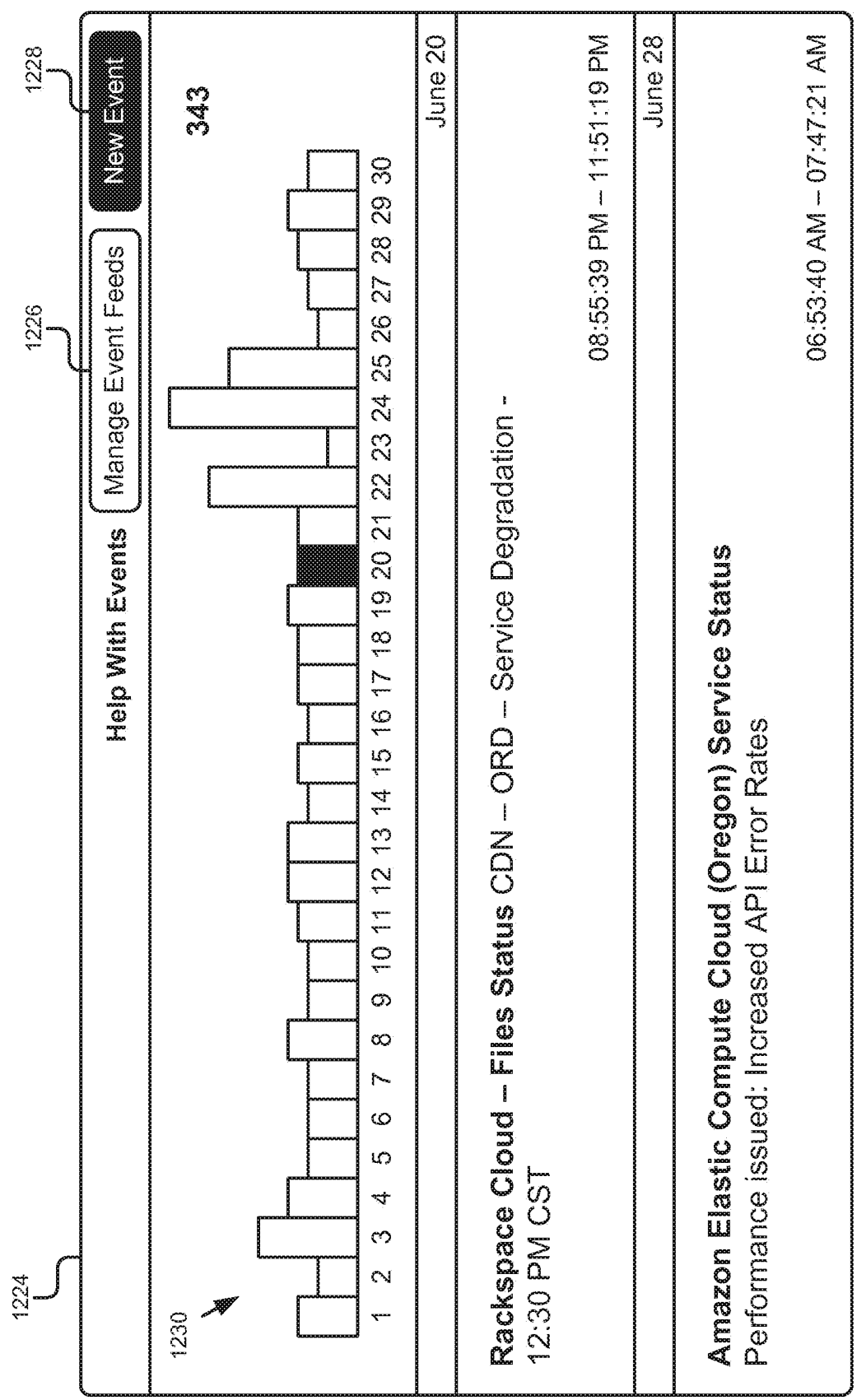

FIG. 12D shows a user interface 1224 for automatically displaying event notifications. The user interface 1224 may include a graphical region 1230 showing the number of notifications received over time, and a menu region options 1226 and 1228 for managing event feeds and inputting user-defined events and/or thresholds. The bars in the graphical region may be individually selected, which can change the notification information displayed below the graphical region 1230. The application performance monitor 108 may correlates contextual activity to application behavior and provide preconfigured event feeds for events that commonly occur via the user interface 1224.

Figure 12E:
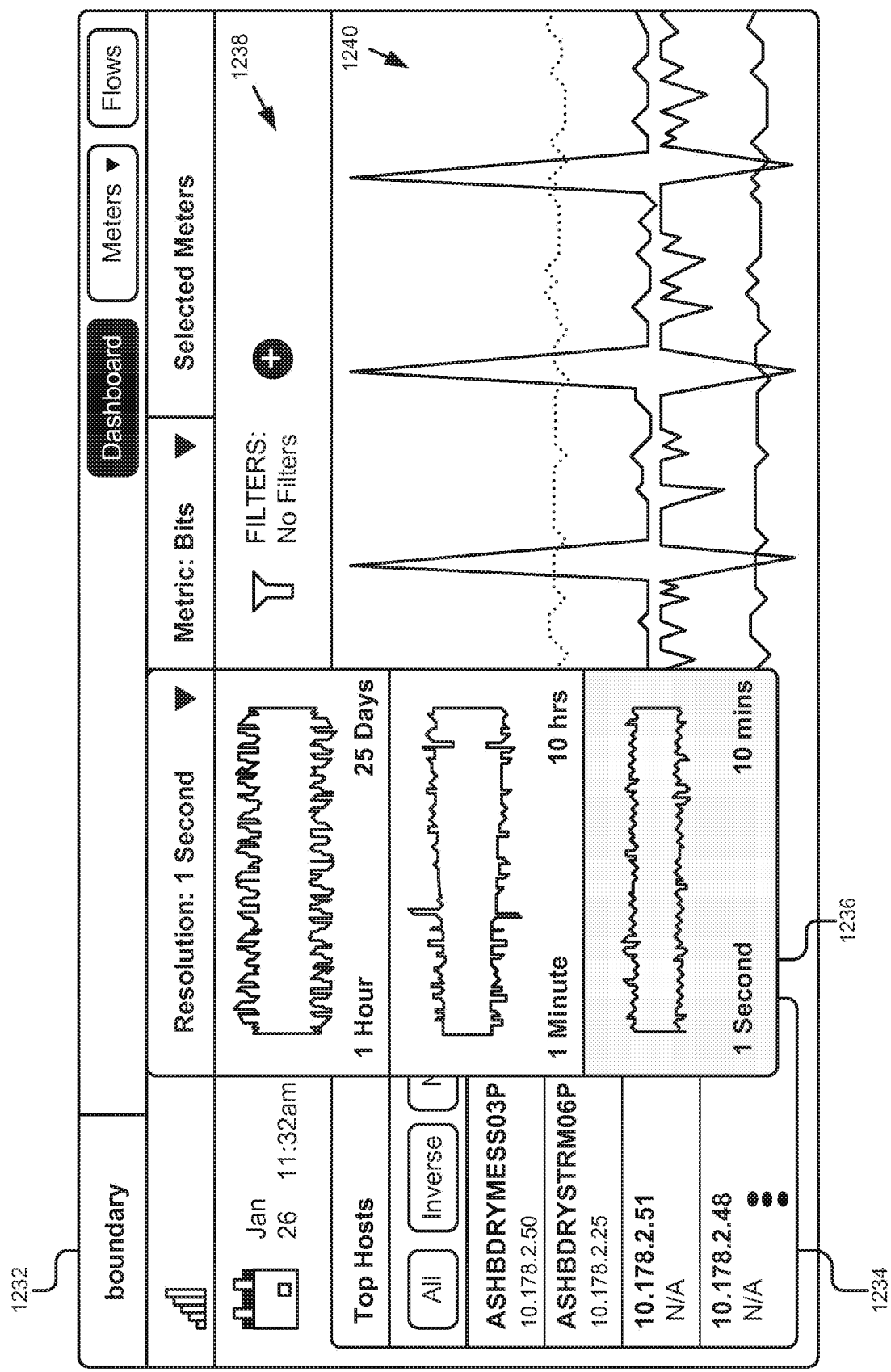

FIG. 12E shows a user interface 1232 for viewing visualized application performance data. The user interface 1232 may include a region 1234 for displaying top hosts that are exchanging data and a resolution selector 1236 for selecting the resolution at which the data should be displayed in the visual change log region 1240, which can be annotated with events detected by the application performance monitor 108. The events may be selected (e.g., using a single click) to show a visualization of application behavior at the time of the event. The visual change log region 1240 provides a graphical timeline for traffic being sent and received by the hosts selected in the region 1234. The user interface 1238 may also include a filter region for inputting custom filters for filtering the data included in the visual change log region 1240.

Figure 12F:
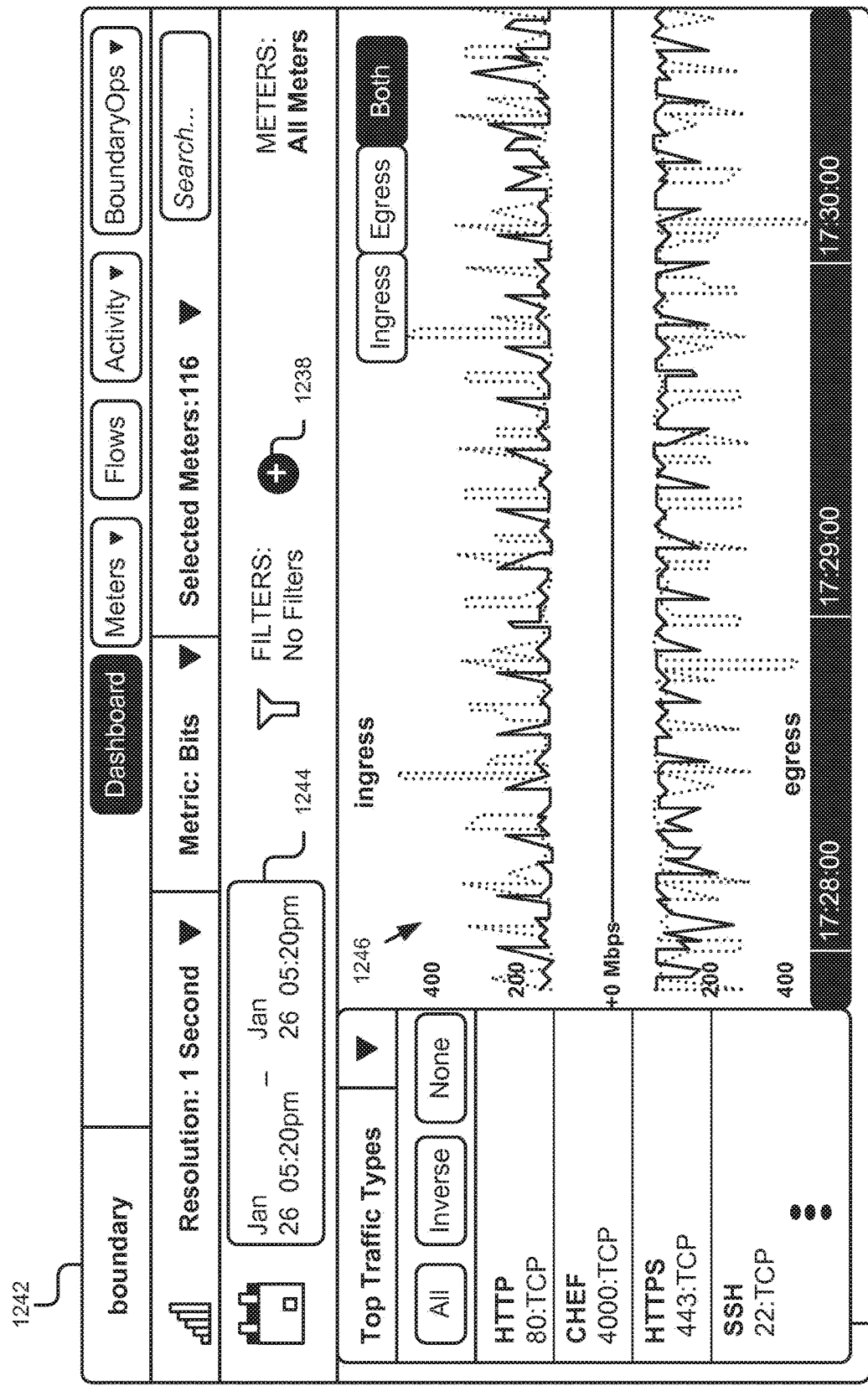
Figure 12G:
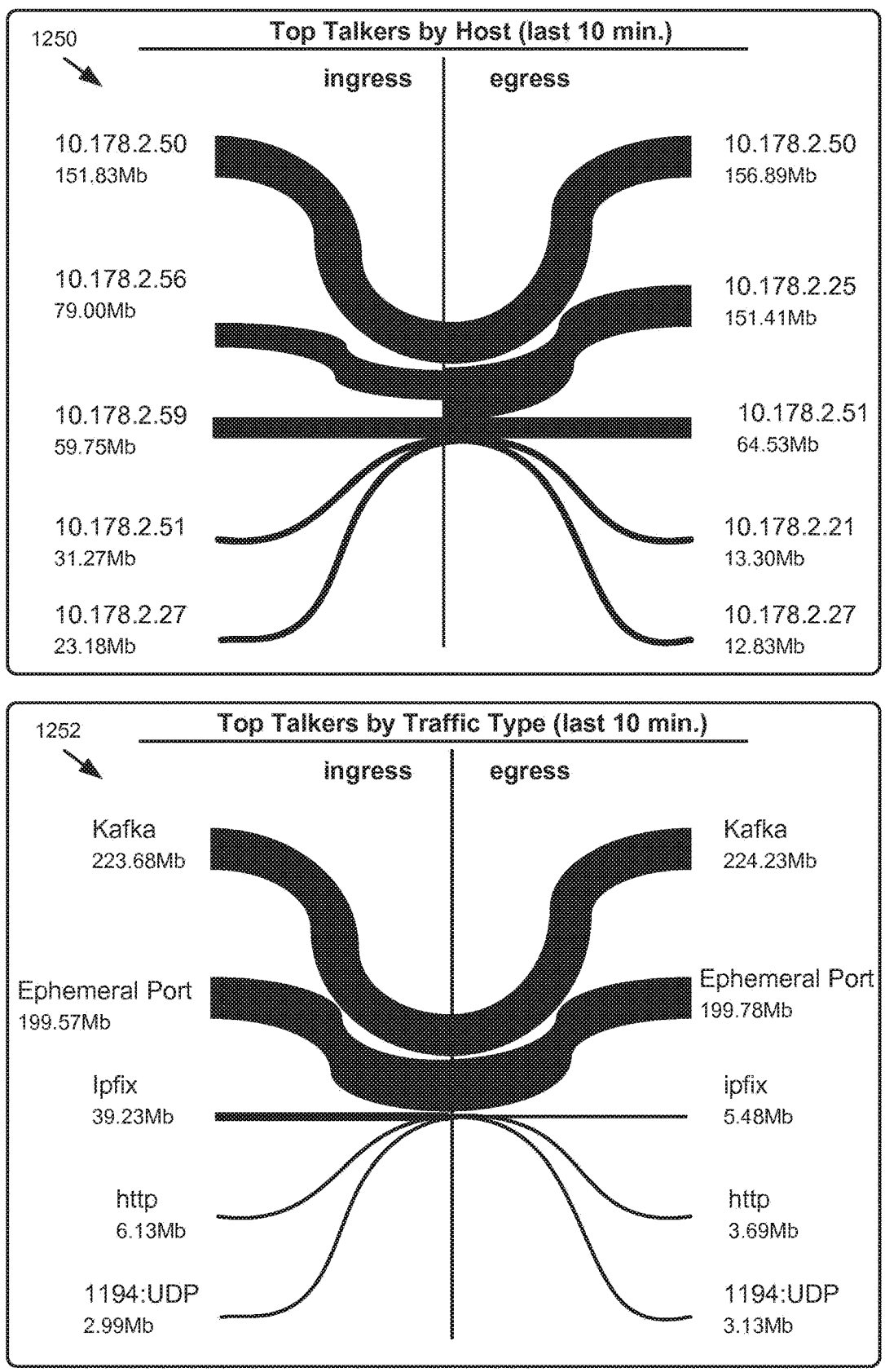

FIG. 12F shows a user interface 1242 for displaying ingress and egress traffic for a set of meters selected via the user interface 1242. For example, the user interface 1242 may be used to select all meters 102 associated with an application, where each of the meters 102 monitors an application node. The user interface 1242 may include a region 1218 for displaying top types of traffic being received and sent, a date selection region 1244 for defining the time period for which data should be displayed, a visual change log region 1246 for graphically displaying changes in the amount of data being sent and received and for displaying notifications of events that are responsible for any significant and/or problematic changes, and a filter region 1238 for inputting custom filters for filtering the data included in the visual change log region 1246. FIG. 12G shows user interface regions 1250 and 1252, which can be included in the user interface 1242 of FIG. 12F to respectively graphically illustrate which hosts send and receive the most data and which traffic types are used the most to send and receive the data.

In the above description, for purposes of explanation, numerous specific details are set forth in order to provide a thorough understanding of the disclosure. It will be apparent, however, that the disclosure can be practiced without these specific details. In other instances, structures and devices are shown in block diagram form in order to avoid obscuring the disclosure. Moreover, the present disclosure is described below primarily in the context of a monitoring application on cloud computing platforms; however, it should be understood that the present disclosure applies to monitoring any type of network communication.

Reference in the specification to "one embodiment," "an embodiment," "some embodiments" or "other embodiments" means that a particular feature, structure, or characteristic described in connection with the embodiment is included in at least one embodiment of the present disclosure. The appearances of the phrase "in one embodiment," "some embodiments" or "other embodiments" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those in the data processing arts to most effectively convey the substance of their work to others. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can include, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The foregoing description of the embodiments of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory, and the mechanisms that implement the present disclosure or its features may have different names, divisions and/or formats. Furthermore, as will be apparent to one of ordinary skill in the relevant art, the modules, routines, features, attributes, methodologies and other aspects of the present disclosure can be implemented as software, hardware, firmware or any combination of the three. Also, wherever a component, an example of which is a module, of the present disclosure is implemented as software, the component can be implemented as a stand-alone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present disclosure is in no way limited to implementation in any specific programming language, or for any specific operating system or environment. Accordingly, the disclosure of the present disclosure is intended to be illustrative, but not limiting, of the scope of the present disclosure, which is set forth in the following claims.

What is claimed is:

1. A computer-implemented method comprising:
 deploying a meter on each of a plurality of server instances in a cloud network, the plurality of server instances hosting a corresponding plurality of application instances of a first application being executed on the cloud network;
 capturing, via the meter, data streams that include operational data of the plurality of application instances;
 processing the data streams corresponding to the plurality of application instances to generate performance data for the first application, the performance data including one or more performance metrics describing the corresponding performance of each of the plurality of application instances;
 generating, based on the performance data for the first application, comparative statistics on the performance of the first application relative to the performance of a second application executed on the cloud network; and
 reallocating, based on the comparative statistics, resources on the cloud network for execution of the first application.

2. The computer-implemented method of claim 1, further comprising:
 grouping the data streams corresponding to the plurality of application instances as being associated with the first application.

3. The computer-implemented method of claim 1, wherein the processing of the data streams to generate the performance data includes using network traffic data included in the data streams to generate a dynamic application topology, and wherein the dynamic application topology automatically maps resources being used by the first application and identifies changes to the application topology as the changes occur.

4. The computer-implemented method of claim 1, further comprising:
 analyzing the data streams across a plurality of entities;
 generating insights across the plurality of entities based on the analyzing; and
 including the insights across the plurality of entities in the performance data of the first application.

5. The computer-implemented method of claim 4, wherein the entities include one or more cloud computing platforms and one or more customers, and wherein the insights across the plurality of entities include comparative insights that compare a performance of one or more aspects of the cloud computing platforms and customers, the aspects including one or more of an application, an infrastructure, a network, an Internet Protocol (IP) service, an operating system, a platform stack, an architecture, and a geographical region.

6. The computer-implemented method of claim 1, further comprising:
 determining an event to monitor for the first application;
 setting a threshold for the event;
 monitoring the data streams for one or more instances of the event;
 determining the threshold to be satisfied by the one or more instances of the event; and
 indicating that the event has occurred.

7. The computer-implemented method of claim 6, wherein the determining the event and the setting the threshold include automatically monitoring the data streams over time to determine an application trend and setting the threshold based on the application trend.

8. A computer program product comprising a non-transitory computer usable medium including a computer-readable program, wherein the computer-readable program when executed on a computer causes the computer to:
 deploy a meter on each of a plurality of server instances in a cloud network, the plurality of server instances hosting a corresponding plurality of application instances of a first application being executed on the cloud network;
 capture, via the meter, data streams that include operational data of the plurality of application instances;
 process the data streams corresponding to the plurality of application instances to generate performance data for the first application, the performance data including one or more performance metrics describing the corresponding performance of each of the plurality of application instances;
 generate, based on the performance data for the first application, comparative statistics on the performance of the first application relative to the performance of a second application executed on the cloud network; and
 reallocate, based on the comparative statistics, resources on the cloud network for execution of the first application.

9. The computer program product of claim 8, wherein the computer-readable program, when executed on the computer, further causes the computer to:
 group the data streams corresponding to the plurality of application instances as being associated with the first application.

10. The computer program product of claim 8, wherein to process the data streams to generate the performance data the computer uses network traffic data included in the data streams to generate a dynamic application topology, and wherein the dynamic application topology automatically maps resources being used by the first application and identifies changes to the application topology as the changes occur.

11. The computer program product of claim 8, wherein the computer-readable program, when executed on the computer, further causes the computer to:
 analyze the data streams across a plurality of entities; and
 generate insights across the plurality of entities based on the analyzing, wherein the performance data includes the insights across the plurality of entities.

12. The computer program product of claim 11, wherein the entities include one or more cloud computing platforms and one or more customers, and wherein the insights across the plurality of entities include comparative insights that compare a performance of one or more aspects of the cloud computing platforms and customers, the aspects including one or more of an application, an infrastructure, a network, an Internet Protocol (IP) service, an operating system, a platform stack, an architecture, and a geographical region.

13. The computer program product of claim 8, wherein the computer-readable program, when executed on the computer, further causes the computer to:
 determine an event to monitor for the first application;
 set a threshold for the event;
 monitor the data streams for one or more instances of the event;
 determine the threshold to be satisfied by the one or more instances of the event; and
 indicate that the event has occurred.

14. The computer program product of claim 13, wherein to determine the event and to set the threshold include automatically monitoring the data streams over time to determine an application trend and setting the threshold based on the application trend.

15. A system comprising:
one or more processors;
one or more collectors executable by the one or more processors to:
deploy a meter on each of a plurality of server instances in a cloud network, the plurality of server instances hosting a corresponding plurality of application instances of a first application being executed on the cloud network; and
capture, via the meter, data streams that include operational data of the plurality of application instances; and
an analyzer executable by the one or more processors to:
process the data streams corresponding to the plurality of application instances to generate performance data for the first application, the performance data including one or more performance metrics describing the corresponding performance of each of the plurality of application instances;
generate, based on the performance data for the first application, comparative statistics on the performance of the first application relative to the performance of a second application executed on the cloud network; and
reallocate, based on the comparative statistics, resources on the cloud network for the execution of the first application.

16. The system of claim 15, further comprising:
a messaging unit executable by the one or more processors to group the plurality of data streams corresponding to the plurality of application instances as being associated with the first application, the messaging unit being coupled to the one or more collectors to receive the data streams and further being coupled to the analyzer to provide the data streams to the analyzer and to receive the performance data from the analyzer.

17. The system of claim 15, wherein the analyzer is configured to use network traffic data included in the data streams to generate a dynamic application topology, and wherein the dynamic application topology automatically maps resources being used by the first application and identifies changes to the application topology as they occur.

18. The system of claim 15, wherein the analyzer is configured to analyze the data streams across a plurality of entities and generate insights across the plurality of entities based on the analyzing of the data streams, and wherein the performance data for the first application includes the insights across the plurality of entities.

19. The system of claim 18, wherein the entities include one or more cloud computing platforms and one or more customers, and wherein the insights across the plurality of entities include comparative insights that compare a performance of one or more aspects of the one or more cloud computing platforms and one or more customers, the aspects including one or more of an application, an infrastructure, a network, an Internet Protocol (IP) service, an operating system, a platform stack, an architecture, and a geographical region.

20. The system of claim 15, wherein:
the analyzer is configured to determine an event to monitor for the first application and set a threshold for the event; and
the analyzer is further configured to monitor the data streams for one or more instances of the event and determine the threshold to be satisfied by the one or more instances of the event.

* * * * *